US 9,236,821 B2

(12) United States Patent
Shiota et al.

(10) Patent No.: US 9,236,821 B2
(45) Date of Patent: Jan. 12, 2016

(54) MAGNETIC POLE POSITION ESTIMATING APPARATUS FOR ELECTRIC MOTOR, CONTROLLING APPARATUS FOR ELECTRIC MOTOR, AND MAGNETIC POLE POSITION ESTIMATING METHOD FOR ELECTRIC MOTOR

(71) Applicant: KABUSHIKI KAISHA YASKAWA DENKI, Kitakyushu-shi (JP)

(72) Inventors: Takayuki Shiota, Fukuoka (JP); Shinya Morimoto, Fukuoka (JP); Hideaki Iura, Fukuoka (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 25 days.

(21) Appl. No.: 14/455,944

(22) Filed: Aug. 11, 2014

(65) Prior Publication Data

US 2014/0346984 A1   Nov. 27, 2014

Related U.S. Application Data

(63) Continuation of application No. PCT/JP2012/054300, filed on Feb. 22, 2012.

(51) Int. Cl.
| H02P 21/00 | (2006.01) |
| H02P 6/18 | (2006.01) |
| H02P 21/14 | (2006.01) |

(52) U.S. Cl.
CPC ............ *H02P 6/183* (2013.01); *H02P 21/0039* (2013.01); *H02P 21/146* (2013.01)

(58) Field of Classification Search
CPC ... H02P 21/146; H02P 21/0035; H02P 6/183; H02P 2203/11
USPC ............. 318/400.02, 400.14, 400.26, 400.33, 318/704, 714, 720, 721, 722, 437, 504
See application file for complete search history.

(56) References Cited

U.S. PATENT DOCUMENTS 7,245,104 B2 *  7/2007  Tomigashi .......... H02P 21/0035
                                                          318/700
7,602,139 B2 * 10/2009  Ho ........................... H02P 6/185
                                                          318/400.02

(Continued)

FOREIGN PATENT DOCUMENTS

| JP | 2002-262592 | 9/2002 |
| JP | 2006-014496 | 1/2006 |

(Continued)

OTHER PUBLICATIONS

International Search Report for corresponding International Application No. PCT/JP2012/054300, May 22, 2012.
Written Opinion for corresponding International Application No. PCT/JP2012/054300, May 22, 2012.

*Primary Examiner* — Bentsu Ro
*Assistant Examiner* — Thai Dinh
(74) *Attorney, Agent, or Firm* — Mori & Ward, LLP

(57) ABSTRACT

A controlling apparatus for an electric motor according to an embodiment includes a superposed component generator, an inverter, a current detector, and a magnetic pole position estimator. The superposed component generator generates, at a predetermined cycle, a superposed voltage reference of which vector is shifted by 90 degrees with respect to that of a superposed voltage reference previously generated, in a coordinate system that is set to a stator of the electric motor. The inverter outputs a driving voltage that is based on a driving voltage reference superposed with the superposed voltage reference to the electric motor. The current detector detects currents flowing into respective phases of the electric motor, and outputs the detected currents. The magnetic pole position estimator detects the magnetic pole position of the electric motor based on an amount of change in the detected currents at the predetermined cycle.

11 Claims, 9 Drawing Sheets

(56) References Cited

U.S. PATENT DOCUMENTS

| | | | |
|---|---|---|---|
| 8,519,652 B2 * | 8/2013 | Ito | H02P 6/18 318/400.01 |
| 8,531,141 B2 * | 9/2013 | Wu | H02P 21/145 318/400.02 |
| 8,723,460 B2 * | 5/2014 | Wu | H02P 21/14 318/400.02 |
| 2010/0045218 A1 | 2/2010 | Tomigashi | |

FOREIGN PATENT DOCUMENTS

| | | |
|---|---|---|
| JP | 4670044 B2 | 8/2006 |
| JP | 2009-303328 | 12/2009 |
| JP | 2010-051078 | 3/2010 |

\* cited by examiner

MAGNETIC POLE POSITION ESTIMATING APPARATUS FOR ELECTRIC MOTOR, CONTROLLING APPARATUS FOR ELECTRIC MOTOR, AND MAGNETIC POLE POSITION ESTIMATING METHOD FOR ELECTRIC MOTOR

CROSS-REFERENCE TO RELATED APPLICATIONS

This application is a continuation of PCT international application Ser. No. PCT/JP2012/054300 filed on Feb. 22, 2012 which designates the United States; the entire contents of which are incorporated herein by reference.

FIELD

The present invention relates to a magnetic pole position estimating apparatus for an electric motor, a controlling apparatus for an electric motor, and a magnetic pole position estimating method for an electric motor.

BACKGROUND

Magnetic pole position estimating apparatuses for estimating the position of the magnetic poles in a salient electric motor have conventionally been known. A known example of such magnetic pole position estimating apparatuses estimates a magnetic pole position in an electric motor by superimposing a high frequency component on a pulse-width modulated (PWM) signal.

The magnetic pole position estimating apparatus disclosed in Japanese Patent No. 4670044, for example, estimates a magnetic pole position in an electric motor by generating a PWM signal to be applied to the respective three-phase windings in the following fashion. Considering successive three cycles of a carrier as one interval, the magnetic pole position estimating apparatus multiplies each original reference value by three for one third of the period (the first one cycle of the carrier), and superposes a high-frequency component for the remaining two third of the period (the remaining two cycles of the carrier).

The magnetic pole position estimating apparatus disclosed in Patent Literature 1, however, can update the original reference values for driving the electric motor only once in the three-cycle unit of the carrier.

SUMMARY

A controlling apparatus for an electric motor according to an embodiment includes a superposed component generator, an inverter, a current detector, and a magnetic pole position estimator. The superposed component generator generates, at a predetermined cycle, a superposed voltage reference of which vector is shifted by 90 degrees with respect to that of a superposed voltage reference previously generated, in a coordinate system that is set to a stator of the electric motor. The inverter outputs a driving voltage that is based on a driving voltage reference superposed with the superposed voltage reference to the electric motor. The current detector detects currents flowing into respective phases of the electric motor, and outputs the detected currents. The magnetic pole position estimator detects a magnetic pole position of the electric motor based on an amount of change in the detected currents at the predetermined cycle.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Some embodiments of a magnetic pole position estimating apparatus for an electric motor, a controlling apparatus for an electric motor, and a magnetic pole position estimating method for an electric motor disclosed herein will be explained in detail with reference to some drawings. A controlling apparatus for an electric motor includes the magnetic pole position estimating apparatus, and the controlling apparatus for an electric motor is hereunder simply referred to as a "controlling apparatus". The embodiments described hereunder are not intended to limit the scope of the present invention in any way.

First Embodiment

Figure 1:
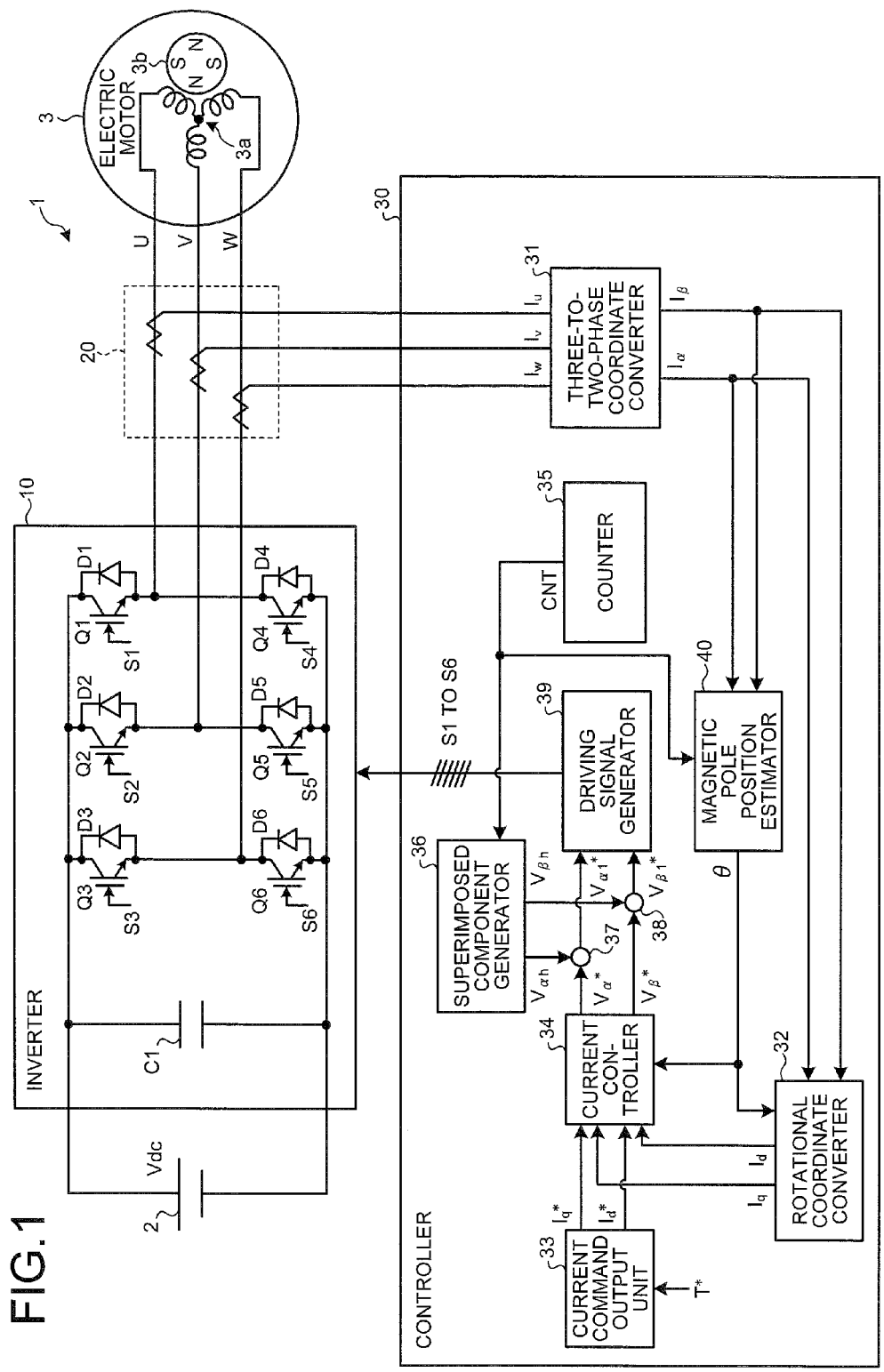
FIG. 1 is a schematic of a configuration of a controlling apparatus for an electric motor according to a first embodiment.

To begin with, a controlling apparatus according to a first embodiment will be explained. FIG. 1 is a schematic of a configuration of a controlling apparatus according to the first embodiment.

As illustrated in FIG. 1, this controlling apparatus 1 according to the first embodiment includes an inverter 10, a current detector 20, and a controller 30. The controlling apparatus 1 is connected between a direct current (DC) power source 2 and an electric motor 3, and causes the inverter 10 to convert a DC voltage Vdc supplied from the DC power source 2 into an alternating current (AC) voltage and to output the AC voltage to the electric motor 3 whereby allowing the electric motor 3 to operate.

The electric motor 3 is a salient electric motor, and includes a stator 3a with armature windings, and a rotor 3b with a plurality of permanent magnets circumferentially arranged and embedded in a rotor core. Examples of the electric motor 3 include an interior permanent magnet synchronous motor.

The inverter 10 includes switching elements Q1 to Q6, diodes D1 to D6, and a smoothing capacitor C1. The switching elements Q1 to Q6 are three-phase-bridge connected. The diodes D1 to D6 are anti-parallel connected to the respective switching elements Q1 to Q6.

The switching elements Q1 to Q6 in the inverter 10 are controlled based on driving signals S1 to S6 output from the controller 30, and the inverter 10 outputs a voltage (hereafter, referred to as a driving voltage) that is based on the driving signals S1 to S6 to the electric motor 3. Semiconductor devices such as insulated-gate bipolar transistors (IGBTs) or metal-oxide-semiconductor field-effect transistors (MOS-FETs) are used for the switching elements Q1 to Q6, for example.

The current detector 20 detects the currents flowing into the U phase, the V phase, and the W phase at a position between the inverter 10 and the electric motor 3, and outputs the detected currents $I_U$, $I_V$, and $I_W$ as the detection results. The detected current $I_U$ is an instantaneous U phase current. The detected current $I_V$ is an instantaneous V phase current, and the detected current $I_W$ is an instantaneous W phase current. A current sensor using a Hall effect device that is a magneto-electric transducer may be used as the current detector 20, for example.

The controller 30 includes a three-to-two-phase coordinate converter 31 (an example of a current detector), a rotational coordinate converter 32, a current reference output unit 33, a current controlling unit 34, a counter 35, a superposed component generator 36, adders 37 and 38, a driving signal generator 39, and a magnetic pole position estimator 40. The controller 30 serves as a magnetic pole position estimating apparatus, and is capable of estimating a magnetic pole position θ of the rotor 3b in the electric motor 3 (hereinafter, sometimes referred to as a magnetic pole position θ of the electric motor 3).

The three-to-two-phase coordinate converter 31 converts the detected currents $I_U$, $I_V$, and $I_W$ into an α-axis component and a β-axis component represented by two orthogonal axes in a fixed coordinate system, and acquires a current vector of which vector components are a detected current $I_\alpha$ in an α-axis direction and a detected current $I_\beta$ in a β-axis direction in a αβ axis coordinate system. The αβ axis coordinate system is an orthogonal coordinate system set to the stator 3a in the electric motor 3, and is also referred to as a stator coordinate system. The three-to-two-phase coordinate converter 31 may alternatively be provided to the current detector 20.

The rotational coordinate converter 32 performs coordinate conversion of the components represented in the αβ axis coordinate system output from the three-to-two-phase coordinate converter 31, based on the magnetic pole position θ in the electric motor 3. Through this conversion, the rotational coordinate converter 32 acquires a q-axis detected current $I_q$ and a d-axis detected current $I_d$ that are a q-axis component and a d-axis component represented in a dq-axis rotational coordinate system rotating with the rotor 3b, and outputs the results to the current controlling unit 34. The magnetic pole position θ of the electric motor 3 is a magnetic pole position represented in the αβ axis coordinate system.

The current reference output unit 33 generates a q-axis current reference $I_q^*$ and a d-axis current reference $I_d^*$ based on a torque reference T* received from external, and outputs the references to the current controlling unit 34. The q-axis current reference $I_q^*$ is a current reference for a q-axis component, and the d-axis current reference $I_d^*$ is a current reference for a d-axis component.

The current controlling unit 34 generates an α-axis reference component $V_\alpha^*$ and a β-axis reference component $V_\beta^*$ in the αβ axis coordinate system as a driving voltage, based on the q-axis current reference $I_q^*$, the d-axis current reference $I_d^*$, the q-axis detected current $I_q$, the d-axis detected current $I_d$, and the magnetic pole position θ of the electric motor 3.

Specifically, the current controlling unit 34 adjusts the q-axis voltage reference $V_q^*$ so that the deviation between the q-axis current reference $I_q^*$ and the q-axis detected currents $I_q$ becomes zero, and adjusts the d-axis voltage reference $V_d^*$ so that the deviation between the d-axis current reference $I_d^*$ and the d-axis detected currents $I_d$ becomes zero. The current controlling unit 34 also converts the q-axis voltage reference $V_q^*$ and the d-axis voltage reference $V_d^*$ into components in the αβ axis coordinate system based on the magnetic pole position θ of the electric motor 3, whereby generating an α-axis reference component $V_\alpha^*$ and a β-axis reference component $V_\beta^*$ serving as a driving voltage reference.

The counter 35 increments or resets an internal count CNT, and generates a count CNT zero to three based on four intervals in a cycle T which is described later. Specifically, the counter 35 sets CNT=0 when time t=nT (n=0, 1, 2, 3, ...), and sets CNT=1 when the time t=T/4+nT. The counter 35 sets CNT=2 when the time t=T/2+nT, and sets CNT=3 when the time t=3T/4+nT. The counter 35 outputs the generated count CNT to the superposed component generator 36 and to the magnetic pole position estimator 40.

The superposed component generator 36 generates a voltage vector $V_h$ (hereinafter, sometimes referred to as a pilot voltage $V_h$) as a superposed voltage reference to be superposed on the α-axis reference component $V_\alpha^*$ and the β-axis reference component $V_\beta^*$. Specifically, the superposed component generator 36 generates, at a predetermined cycle, a pilot voltage $V_h$ of which vector in the αβ axis coordinate system is shifted by 90 degrees from a pilot voltage $V_h$ previously generated. The pilot voltage $V_h$ is composed of an α-axis reference component $V_{\alpha h}$ that is an α-axis component and a β-axis reference component $V_{\beta h}$ that is β-axis component.

An adder 37 outputs an α-axis reference component $V_{\alpha 1}^*$ generated by adding the α-axis reference component $V_\alpha^*$ received from the current controlling unit 34 and the α-axis reference component $V_{\alpha h}$ received from the superposed component generator 36 to the driving signal generator 39. The adder 38 outputs a β-axis reference component $V_{\beta 1}^*$ generated by adding the β-axis reference component $V_\beta^*$ received from the current controlling unit 34 and the β-axis reference component $V_{\beta h}$ received from the superposed component generator 36 to the driving signal generator 39.

The driving signal generator 39 generates driving signals S1 to S6 for driving the inverter 10, based on the α-axis reference component $V_{\alpha 1}^*$ and the β-axis reference component $V_{\beta 1}^*$ output from the adder 37 and the adder 38, respectively, using space vector modulation.

Figure 2A:
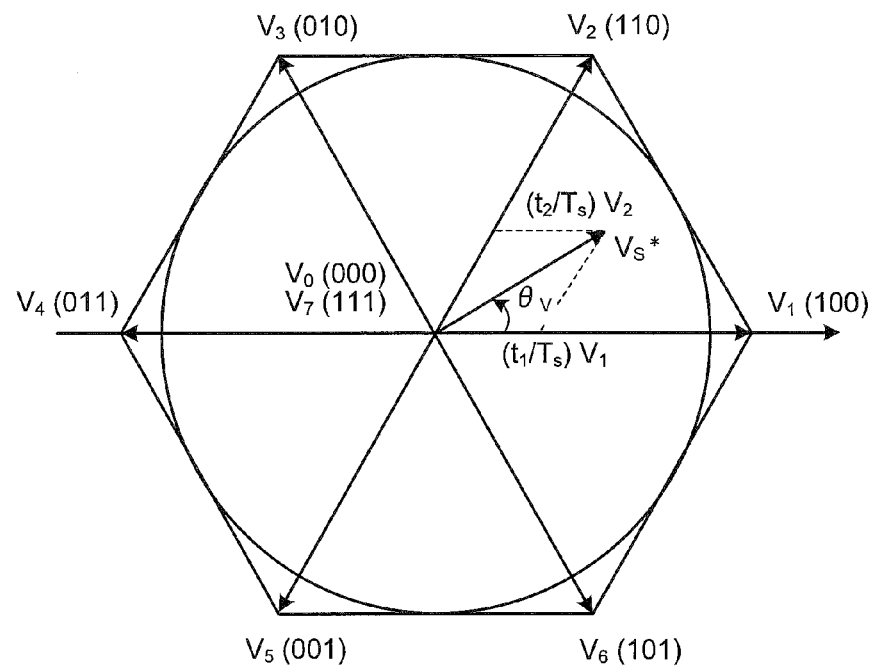
FIG. 2A is a schematic for explaining space vector modulation.
Figure 2B:
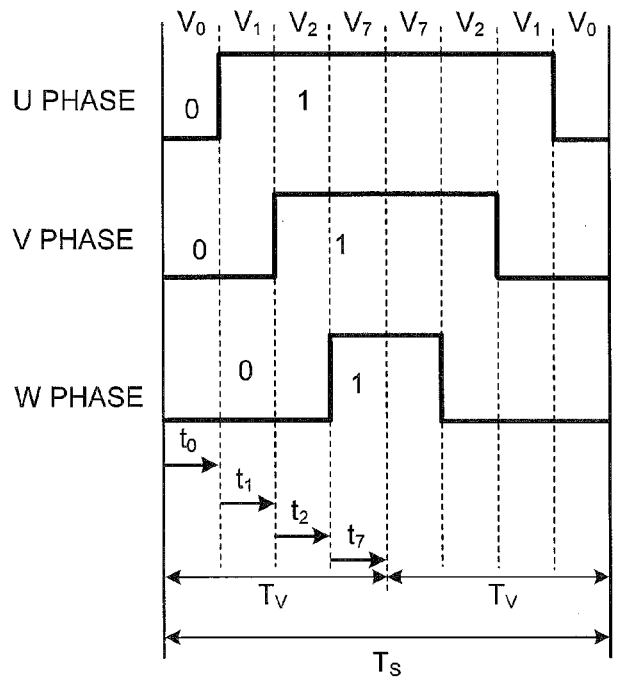
FIG. 2B is another schematic for explaining the space vector modulation.

FIGS. 2A and 2B are schematics for explaining the space vector modulation. In these drawings, a cycle $T_S$ that is arbitrarily set is represented as $2T_V$. FIG. 2A illustrates voltage vectors $V_0$ to $V_7$ in the space vector modulation. In the example illustrated in these drawings, a voltage reference vector $Vs^*$ defined by the α-axis reference component $V_{α1}^*$ and β-axis reference component $V_{β1}^*$ is generated with two adjacent voltage vectors $V_1$ and $V_2$.

The voltage vector $V_1$ (100) sets the upper U phase switching element Q1 in the inverter 10 ON, sets the lower U phase switching element Q4 OFF, sets the upper V phase switching element Q2 and the upper W phase switching element Q3 OFF, and sets the lower V phase switching element Q5 and the lower W phase switching element Q6 ON. The voltage vector $V_2$ (110) sets the upper U phase switching element Q1 and the upper V phase switching element Q2 ON, sets the lower U phase switching element Q4 and the lower V phase switching element Q5 OFF, sets the upper W phase switching element Q3 OFF, and sets the lower W phase switching element Q6 ON.

The switching statuses of the respective phases in a cycle T are illustrated in FIG. 2B. The ON time $t_1$ and $t_2$ illustrated in FIG. 2B are calculated from Equations (1) and (2), respectively. In the Equations (1) and (2), $θ_V$ denotes a phase angle starting from the voltage vector $V_1$ and ending at the voltage reference vector $Vs^*$, and $|Vs^*|$ denotes the amplitude of the voltage reference vector $Vs^*$. $V_{max}$ denotes the maximum output voltage of the inverter 10.

Equation 1

$$t_1 = \frac{2}{\sqrt{3}} \frac{|V_s^*|}{V_{max}} T_s \cdot \sin\left(\frac{\pi}{3} - θ_V\right) \quad (1)$$

$$t_2 = \frac{2}{\sqrt{3}} \frac{|V_s^*|}{V_{max}} T_s \cdot \sin θ_V \quad (2)$$

The driving signal generator 39 updates the voltage reference vector $Vs^*$ once in every half cycle that is $T_V$ of the arbitrarily set cycle $T_S$. The OFF time $t_0$ and $t_7$ are set by dividing the time remaining by subtracting the ON time $t_1$ and $t_2$ from the half cycle $T_V$. The voltage reference vector $Vs^*$ is set in the other sectors in the same manner.

The magnetic pole position estimator 40 estimates the magnetic pole position θ of the electric motor 3 based on the amount of change in the detected currents $I_α$ and $I_β$ input from the three-to-two-phase coordinate converter 31, and outputs the estimation result to the rotational coordinate converter 32 and to the current controlling unit 34.

The controlling apparatus 1 is enabled to estimate the magnetic pole position θ of the electric motor 3 easily using the pilot voltage $V_h$, which is generated at a predetermined cycle by superposed component generator 36 and of which phase is shifted by 90 degrees, and the currents flowing into the respective phases in the electric motor 3, without affecting the cycle of updating the driving voltage reference for driving the electric motor 3. The estimation of the magnetic pole position θ will now be explained more specifically.

To begin with, the current-voltage equation for the salient electric motor 3 in the αβ axis coordinate system can be expressed as following Equation (3). $V_α$ and $V_β$ represent voltage components of the electric motor 3 in the αβ axis coordinate system. $I_α$ and $I_β$ denote components of the currents flowing into the electric motor 3 in the αβ axis coordinate system. R denotes the armature resistance of the electric motor 3, and L and l denote the inductance of the armature reaction in the electric motor 3. $K_e$ denotes the induction voltage constant of the electric motor 3, and ωr denotes a rotational speed of the magnetic poles.

Equation 2

$$\begin{bmatrix} V_α \\ V_β \end{bmatrix} = R \begin{bmatrix} I_α \\ I_β \end{bmatrix} + \begin{bmatrix} L + l\cos 2θ & l\sin 2θ \\ l\sin 2θ & L - l\cos 2θ \end{bmatrix} \frac{d}{dt}\begin{bmatrix} I_α \\ I_β \end{bmatrix} + \frac{d}{dt}\left\{\begin{bmatrix} L + l\cos 2θ & l\sin 2θ \\ l\sin 2θ & L - l\cos 2θ \end{bmatrix}\right\}\begin{bmatrix} I_α \\ I_β \end{bmatrix} + K_e\begin{bmatrix} -ω_r\sin θ \\ ω_r\cos θ \end{bmatrix} \quad (3)$$

Figure 3:
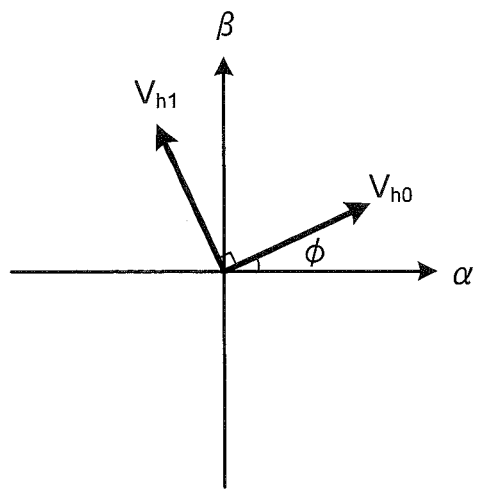
FIG. 3 is a schematic of an example of a relation between voltage vectors and $\phi$ in an $\alpha\beta$ axis coordinate system.

Now consider how the pilot voltage $V_h$ is to be included in the driving voltage that is based on the q-axis voltage reference $V_q^*$ and the d-axis voltage reference $V_d^*$ that are driving voltage references, as an output voltage from the inverter 10. For example, in the αβ axis coordinate system, a voltage vector $V_{h0}$ is superposed, and a voltage vector $V_{h1}$ is superposed after a specified time period has elapsed, as illustrated in FIG. 3. FIG. 3 is a schematic of an example of a relation between the voltage vectors $V_{h0}$ and $V_{h1}$, and ϕ in the αβ axis coordinate system.

The voltage vector $V_{h0}$ is a vector of which phase difference is ϕ degrees in the positive direction of the α axis and of which amplitude is $V_{inj1}$ (>0), and is expressed as following Equation (4). The voltage vector $V_{h1}$ is a vector of which phase difference is ϕ+90 degrees in the positive direction of the α axis and of which amplitude is $V_{inj1}$ (>0), and is expressed as following Equation (5).

Equation 3

$$V_{h0} = \begin{bmatrix} V_{inj1} \cos ϕ \\ V_{inj1} \sin ϕ \end{bmatrix} \quad (4)$$

$$V_{h1} = \begin{bmatrix} -V_{inj1} \sin ϕ \\ V_{inj1} \cos ϕ \end{bmatrix} \quad (5)$$

When the time between the two voltage vectors to be superposed is sufficiently shorter than the cycle of the driving voltage, the current-voltage equation with the component of the driving voltage frequency removed from Equation (3) can be approximated as following Equation (6).

Equation 4

$$\begin{bmatrix} V_α \\ V_β \end{bmatrix} = \begin{bmatrix} L + l\cos 2θ & l\sin 2θ \\ l\sin 2θ & L - l\cos 2θ \end{bmatrix} \frac{d}{dt}\begin{bmatrix} I_α \\ I_β \end{bmatrix} + K_e\begin{bmatrix} -ω_r\sin θ \\ ω_r\cos θ \end{bmatrix} \quad (6)$$

When the rotational speed of the electric motor 3 is low or moderate, the induced voltage in the electric motor 3 can be ignored, and Equation (6) can be approximated as following Equation (7).

Equation 5

$$\begin{bmatrix} V_α \\ V_β \end{bmatrix} = \begin{bmatrix} L + l\cos 2θ & l\sin 2θ \\ l\sin 2θ & L - l\cos 2θ \end{bmatrix} \frac{d}{dt}\begin{bmatrix} I_α \\ I_β \end{bmatrix} \quad (7)$$

Equation (7) can be rewritten as Equation (8) for the current.

Equation 6

$$\frac{d}{dt}\begin{bmatrix} I_\alpha \\ I_\beta \end{bmatrix} = \frac{1}{L^2 - l^2}\begin{bmatrix} L - l\cos2\theta & -l\sin2\theta \\ -l\sin2\theta & L + l\cos2\theta \end{bmatrix}\begin{bmatrix} V_\alpha \\ V_\beta \end{bmatrix} \quad (8)$$

If the voltage vector $V_{h0}$ expressed in Equation (4) is superposed at time $t_{h0}$ and the voltage vector $V_{h1}$ expressed by Equation (5) is superposed at time $t_{h1}$, the current-voltage equations at the time $t_{h0}$ and the time $t_{h1}$ can be expressed as Equations (9) and (10), respectively.

Equation 7

$$\frac{d}{dt}\begin{bmatrix} I_\alpha |_{t=t_{h_0}} \\ I_\beta |_{t=t_{h_0}} \end{bmatrix} = \frac{V_{inj1}}{L^2 - l^2}\begin{bmatrix} (L - l\cos2\theta)\cos\phi - l\sin2\theta \cdot \sin\phi \\ -l\sin2\theta \cdot \cos\phi - (L + l\cos2\theta)\sin\phi \end{bmatrix} \quad (9)$$

$$\frac{d}{dt}\begin{bmatrix} I_\alpha |_{t=t_{h_1}} \\ I_\beta |_{t=t_{h_1}} \end{bmatrix} = \frac{V_{inj1}}{L^2 - l^2}\begin{bmatrix} -(L - l\cos2\theta)\sin\phi - l\sin2\theta \cdot \cos\phi \\ l\sin2\theta \cdot \sin\phi + (L + l\cos2\theta)\cos\phi \end{bmatrix} \quad (10)$$

The relation in Equation (11) is given from Equations (9) and (10).

Equation 8

$$\begin{bmatrix} 2l\sin\phi & 2l\cos\phi \\ 2l\cos\phi & -2l\sin\phi \end{bmatrix}\begin{bmatrix} \sin2\theta \\ \cos2\theta \end{bmatrix} = \frac{L^2 - l^2}{V_{inj1}}\begin{bmatrix} \frac{d}{dt}I_\beta |_{t=t_{h_1}} & -\frac{d}{dt}I_\alpha |_{t=t_{h_0}} \\ -\frac{d}{dt}I_\alpha |_{t=t_{h_1}} & -\frac{d}{dt}I_\beta |_{t=t_{h_0}} \end{bmatrix} \quad (11)$$

Equation (11) can be rewritten as Equation (12) for the magnetic pole position θ of the electric motor 3, and, therefore, the magnetic pole position θ of the electric motor 3 can be estimated by detecting a change in the currents in the respective phases from the time $t_{h0}$ to the time $t_{h1}$.

Equation 9

$$\theta = \frac{1}{2}\tan^{-1}\left\{\frac{-\sin\phi\left(\frac{d}{dt}I_\beta |_{t=t_{h_1}} - \frac{d}{dt}I_\alpha |_{t=t_{h_0}}\right) - \cos\phi\left(-\frac{d}{dt}I_\alpha |_{t=t_{h_1}} - \frac{d}{dt}I_\beta |_{t=t_{h_0}}\right)}{-\cos\phi\left(\frac{d}{dt}I_\beta |_{t=t_{h_1}} - \frac{d}{dt}I_\alpha |_{t=t_{h_0}}\right) + \sin\phi\left(-\frac{d}{dt}I_\alpha |_{t=t_{h_1}} - \frac{d}{dt}I_\beta |_{t=t_{h_0}}\right)}\right\} \quad (12)$$

If φ is set to one of 0 degrees, 90 degrees, 180 degrees, and 270 degrees, the magnetic pole position θ of the electric motor 3 can be estimated with a simpler operation. In other words, Equation (12) can be expressed as Equation (13) below when φ=0 degrees, and as Equation (14) when φ=90 degrees. Equation (12) can be expressed as Equation (15) when φ=180 degrees, and as Equation (16) when φ=270 degrees.

Equation 10

$$\theta = \frac{1}{2}\tan^{-1}\left(\frac{\frac{d}{dt}I_\alpha |_{t=t_{h_1}} + \frac{d}{dt}I_\beta |_{t=t_{h_0}}}{-\frac{d}{dt}I_\beta |_{t=t_{h_1}} + \frac{d}{dt}I_\alpha |_{t=t_{h_0}}}\right) \quad (13)$$

$$\theta = \frac{1}{2}\tan^{-1}\left(\frac{-\frac{d}{dt}I_\beta |_{t=t_{h_1}} + \frac{d}{dt}H I_\beta |_{t=t_{h_0}}}{-\frac{d}{dt}I_\alpha |_{t=t_{h_1}} - \frac{d}{dt}I_\beta |_{t=t_{h_0}}}\right) \quad (14)$$

$$\theta = \frac{1}{2}\tan^{-1}\left(\frac{-\frac{d}{dt}I_\alpha |_{t=t_{h_1}} - \frac{d}{dt}I_\beta |_{t=t_{h_0}}}{\frac{d}{dt}I_\beta |_{t=t_{h_1}} - \frac{d}{dt}I_\alpha |_{t=t_{h_0}}}\right) \quad (15)$$

$$\theta = \frac{1}{2}\tan^{-1}\left(\frac{\frac{d}{dt}I_\beta |_{t=t_{h_1}} - \frac{d}{dt}I_\alpha |_{t=t_{h_0}}}{\frac{d}{dt}I_\alpha |_{t=t_{h_1}} + \frac{d}{dt}I_\beta |_{t=t_{h_0}}}\right) \quad (16)$$

Therefore, by superimposing the voltage vector $V_{h0}$ of which φ is one of 0 degrees, 90 degrees, 180 degrees, and 270 degrees and then superimposing the voltage vector $V_{h1}$, the magnetic pole position θ of the electric motor 3 can be estimated with a simpler operation.

Although explained above is an example in which the voltage vector $V_{h1}$ of which phase is shifted by φ+90 degrees in the positive direction of the α axis is superposed at the time $t_{h1}$, the voltage vector $V_{h1}$ of which phase is shifted by φ−90 degrees in the positive direction of the α axis may be superposed at the time $t_{h1}$ to allow the magnetic pole position θ of the electric motor 3 to be estimated with a simpler operation.

In the manner described above, the voltage vector $V_{h0}$ of one of the phases φ of 0 degrees, 90 degrees, 180 degrees, and 270 degrees is superposed at the time $t_{h0}$, and the voltage vector $V_{h1}$ at a phase of φ+90 degrees or φ−90 degrees is superposed at the time $t_{h1}$. The change in the currents in the respective phases from the time $t_{h0}$ to the time $t_{h1}$ is then detected, and the operations indicated in Equations (13) to (16), for example, are performed, to allow the magnetic pole position θ of the electric motor 3 to be estimated more easily.

The superposed component generator 36, therefore, generates a pilot voltage $V_h$ of which cycle is $T=4T_V$, as indicated in Equation (17), and superposes the pilot voltage $V_h$ on a driving voltage reference that is defined by the α-axis reference component $V_\alpha^*$ and the β-axis reference component $V_\beta^*$. $T_V$ is the update cycle of the driving signal generator 39 performing the space vector modulation.

Equation 11

$$\begin{bmatrix} V_{\alpha h} \\ V_{\beta h} \end{bmatrix} = \quad (17)$$

$$\begin{cases} [V_{inj1} \quad 0]^T, & nT < t \leq T/4 + nT \quad \text{(Time Period } A\text{)} \\ [0 \quad V_{inj1}]^T, & T/4 + nT < t \leq T/2 + nT \quad \text{(Time Period } B\text{)} \\ [-V_{inj1} \quad 0]^T, & T/2 + nT < t \leq 3T/4 + nT \quad \text{(Time Period } C\text{)} \\ [0 \quad -V_{inj1}]^T, & 3T/4 + nT < t \leq (n+1)T \quad \text{(Time Period } D\text{)} \end{cases}$$

Figure 4:
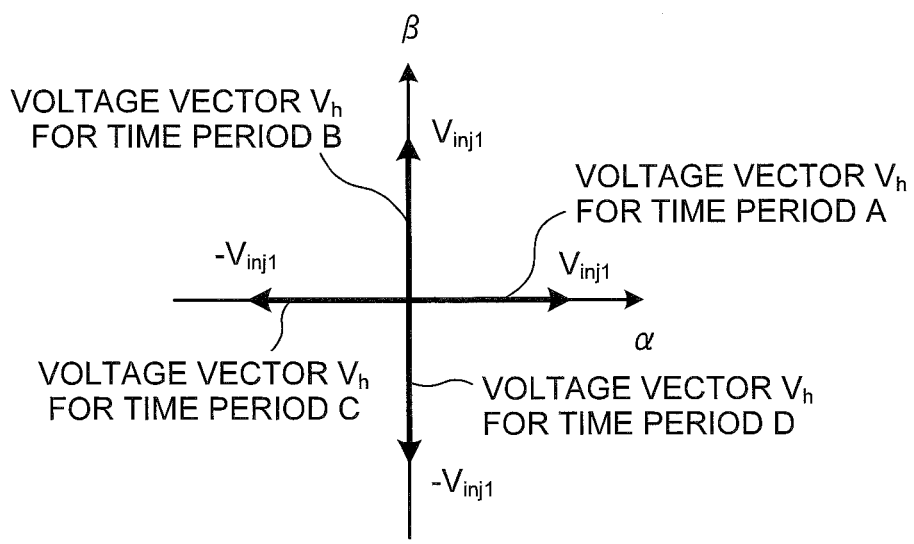
FIG. 4 is a schematic of a change in a pilot voltage in a cycle.

By setting the α-axis reference component $V_{\alpha h}$ and the β-axis reference component $V_{\beta h}$ of the pilot voltage $V_h$ output from the superposed component generator 36 as expressed in Equation (17), a pilot voltage $V_h$ in directions cancelling out each other in the α axis and the β axis can be output, as illustrated in FIG. 4. FIG. 4 is a schematic of a change of the pilot voltage $V_h$ in the cycle T. In this manner, the voltage in the cycle T can be averaged to zero, so that the torque ripple can be reduced.

Figure 5:
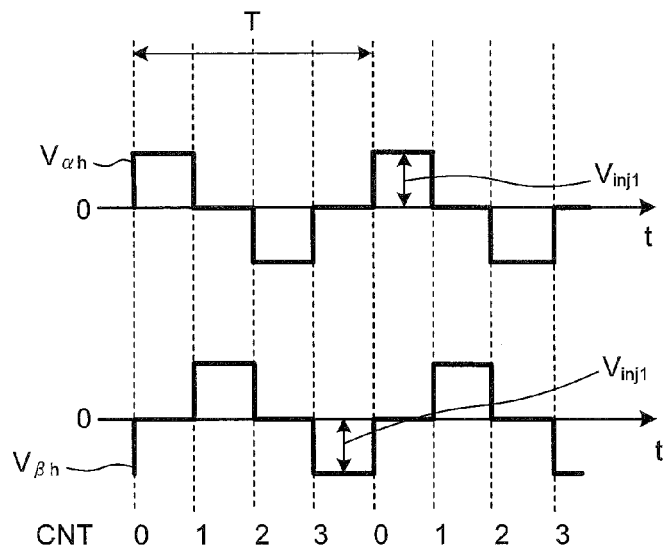
FIG. 5 is a flowchart illustrating a pilot voltage generating process performed by a superposed component generator.
Figure 6:
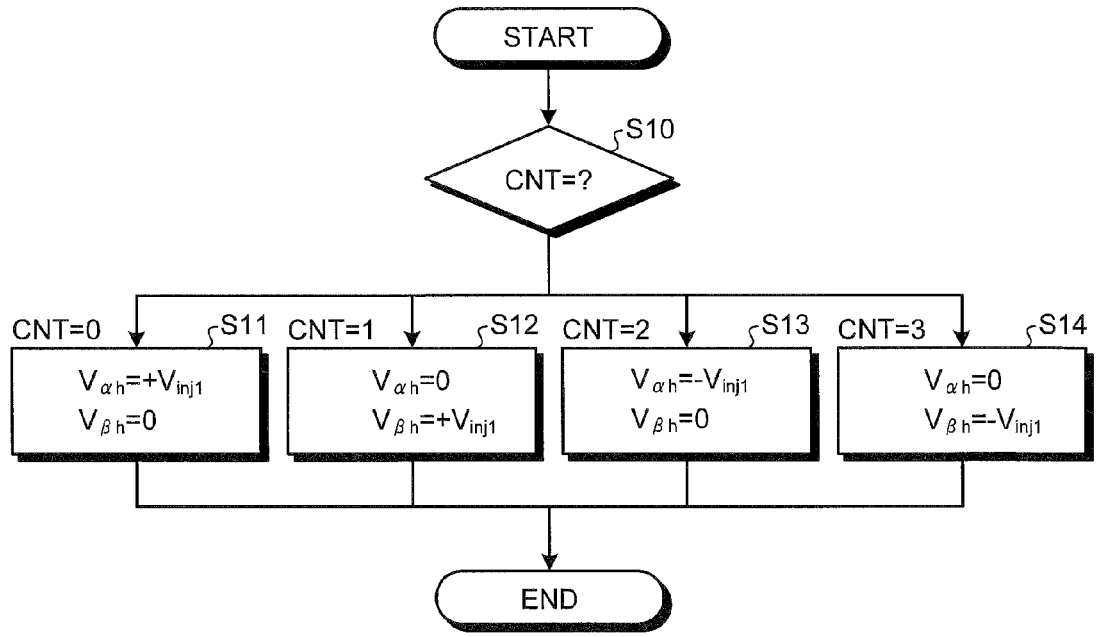
FIG. 6 is a schematic of changes in an $\alpha$-axis component and a $\beta$-axis component of a pilot voltage output from the superposed component generator.

A configuration and an operation of the superposed component generator 36 will be explained more specifically with reference to FIGS. 5 and 6. FIG. 5 is a schematic illustrating a change in $V_{\alpha h}$ and $V_{\beta h}$ that are $\alpha$-axis and $\beta$-axis components of the pilot voltage $V_h$ output from the superposed component generator 36. FIG. 6 is a flowchart illustrating a pilot voltage generating process performed by the superposed component generator 36.

As illustrated in FIG. 5, the superposed component generator 36 generates the $\alpha$-axis reference component $V_{\alpha h}$ and the $\beta$-axis reference component $V_{\beta h}$ that are the $\alpha$-axis component and the $\beta$-axis component of the pilot voltage $V_h$, based on the count CNT of the counter 35 that sequentially outputs zero, one, two, and three as the count CNT.

Specifically, as illustrated in FIG. 6, the superposed component generator 36 determines the count CNT of the counter 35 (Step S10). If the count CNT=0, the superposed component generator 36 generates a pilot voltage $V_h$ of which components are $V_{\alpha h}=+V_{inj1}$ and $V_{\beta h}=0$, and outputs these components to the adders 37 and 38, respectively (Step S11). If the count CNT=1, the superposed component generator 36 generates a pilot voltage $V_h$ in which $V_{\alpha h}=0$ and $V_{\beta h}=+V_{inj1}$ and outputs these components to the adder 37 and to the adder 38, respectively (Step S12).

If the count CNT=2, the superposed component generator 36 generates a pilot voltage $V_h$ of which components are $V_{\alpha h}=-V_{inj1}$ and $V_{\beta h}=0$, and outputs these components to the adder 37 and to the adder 38, respectively (Step S13). If the count CNT=3, the superposed component generator 36 generates a pilot voltage $V_h$ of which components are $V_{\alpha h}=0$ and $V_{\beta h}=-V_{inj1}$, and outputs these components to the adder 37 and to the adder 38, respectively (Step S14).

In this manner, the superposed component generator 36 generates, at every cycle $T_v$, a pilot voltage $V_h$ that is in a direction 90 degrees with respect to the pilot voltage $V_h$ previously generated in the $\alpha\beta$ axis coordinate system. The superposed component generator 36 may also generate, at every cycle $T_v$, a pilot voltage $V_h$ that is in a direction $-90$ degrees with respect to the pilot voltage $V_h$ previously generated in the $\alpha\beta$ axis coordinate system.

The magnetic pole position estimator 40 estimates the magnetic pole position $\theta$ at the time t=nT (n=1, 2, 3, ... ) the magnetic pole position $\theta$ at the time t=T/4+nT, the magnetic pole position $\theta$ at the time t=T/2+nT, and the magnetic pole position $\theta$ at the time t=3T/4+nT. The magnetic pole position estimator 40 determines the count CNT after a predetermined time period elapses from when the count CNT of the counter 35 has changed so that the current corresponding to the pilot voltage $V_h$ generated by the superposed component generator 36 can be detected.

Figure 7:
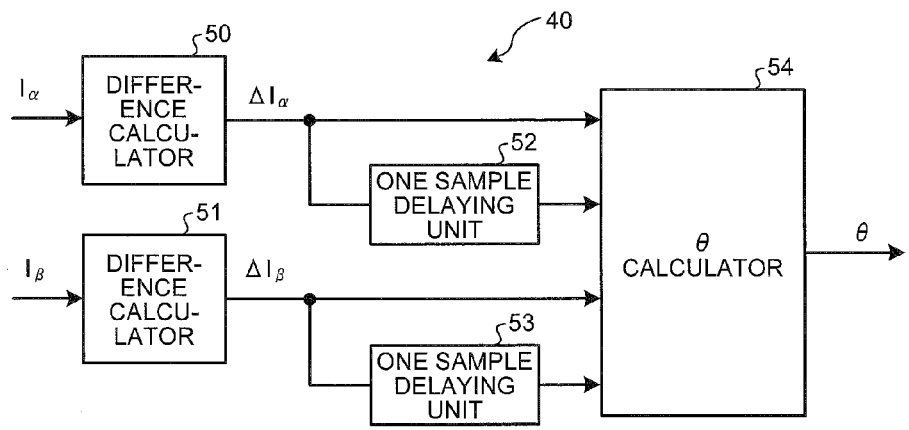
FIG. 7 is a schematic of a configuration of a magnetic pole position estimator.

FIG. 7 is a schematic of a configuration of the magnetic pole position estimator 40. As illustrated in FIG. 7, the magnetic pole position estimator 40 includes difference calculators 50 and 51 (an example of a current difference calculator), a one sample delaying units 52 and 53, and a $\theta$ calculator 54 (an example of magnetic pole position calculator), and operates with a sampling cycle of T/4.

The difference calculator 50 acquires an $\alpha$-axis component detected current $I_\alpha$ from the three-to-two-phase coordinate converter 31, and calculates and outputs a difference $\Delta I_\alpha$ between the detected current $I_\alpha$ and another detected current $I_\alpha$ acquired in a previous sampling time (=T/4). The difference calculator 51 also acquires a $\beta$-axis component detected current $I_\beta$ from the three-to-two-phase coordinate converter 31, and calculates and outputs a difference $\Delta I_\beta$ between the detected current $I_\beta$ and another detected current $I_\beta$ acquired in a previous sampling time.

The one sample delaying unit 52 delays the difference $\Delta I_\alpha$ received from the difference calculator 50 by one sampling time, and outputs the difference to the $\theta$ calculator 54. The one sample delaying unit 53 delays the difference $\Delta I_\beta$ received from the difference calculator 51 by one sampling time, and outputs the difference to the $\theta$ calculator 54.

The $\theta$ calculator 54 estimates the magnetic pole position $\theta$ based on the difference $\Delta I$, and the difference $\Delta I_\beta$ output from the difference calculator 50 and the difference calculator 51, respectively, and the difference $\Delta I_\alpha$ and the difference $\Delta I_\beta$ belonging to the previous sampling time output from the one sample delaying unit 52 and the one sample delaying unit 53, respectively.

Figure 8:
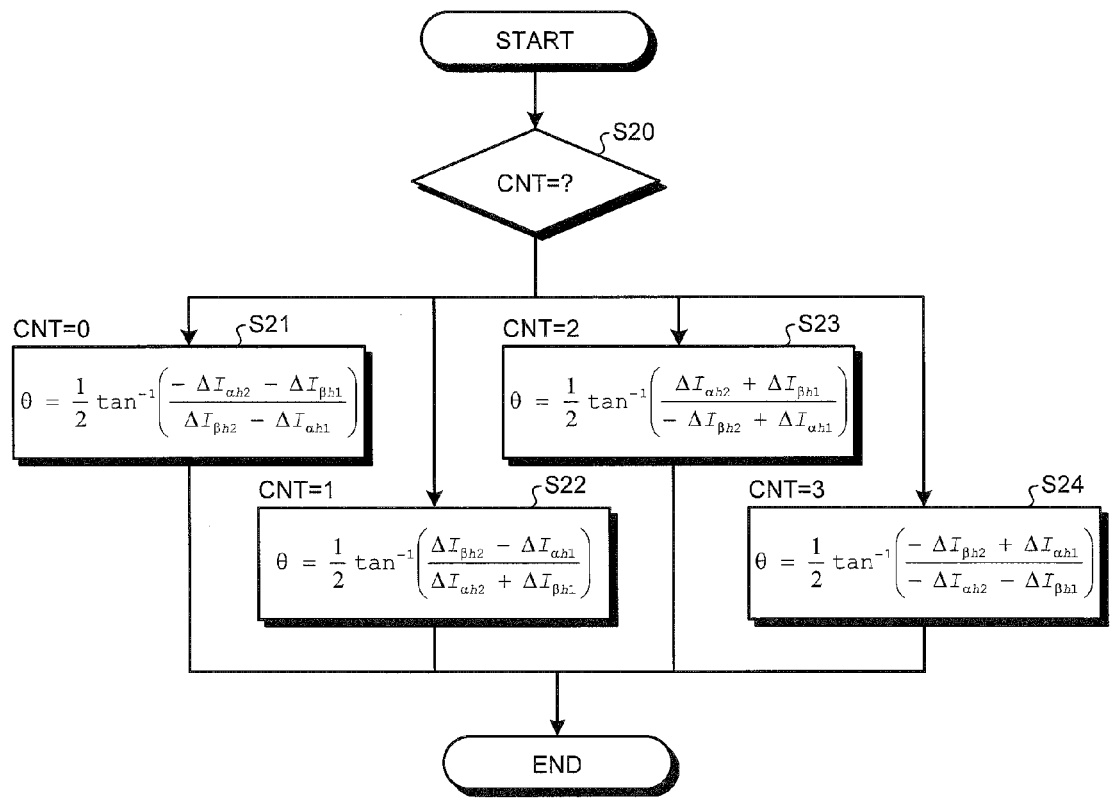
FIG. 8 is a flowchart illustrating a magnetic pole position estimating process performed by the magnetic pole position estimator.

FIG. 8 is a flowchart illustrating a magnetic pole position estimating process performed by the magnetic pole position estimator 40. Hereunder, $\Delta I_{\alpha h2}=I_{\alpha h2}-I_{\alpha h1}$, $\Delta I_{\beta h2}=I_{\beta h2}-I_{\beta h1}$, $\Delta I_{\alpha h1}=I_{\alpha h1}-I_{\alpha h0}$, and $\Delta I_{\beta h1}=I_{\beta h1}-I_{\beta h0}$.

As illustrated in FIG. 8, the magnetic pole position estimator 40 determines the count CNT of the counter 35 (Step S20).

If the count CNT=0, the magnetic pole position estimator 40 calculates the magnetic pole position $\theta$ based on following Equation (18) (Step S21). In Equation (18), the first-order derivatives of the current in Equation (13) are approximated with the current differences.

Equation 12

$$\theta = \frac{1}{2}\tan^{-1}\left(\frac{-\Delta I_{\alpha h2} - \Delta I_{\beta h1}}{\Delta I_{\beta h2} - \Delta I_{\alpha h1}}\right) \quad (18)$$

In Equation (18), the detected currents $I_{\alpha h2}$, $I_{\alpha h1}$, and $I_{\alpha h0}$ represent the $\alpha$-axis components of the detected currents at the time t=nT, $-T/4+nT$, and $-T/2+nT$, respectively. The detected current $I_{\beta h2}$, and $I_{\beta h1}$ represent the $\beta$-axis components of the detected currents at the time t=nT, $-T/4+nT$, and $-T/2+nT$, respectively.

If the count CNT=1, the magnetic pole position estimator 40 calculates the magnetic pole position $\theta$ based on following Equation (19) (Step S22). In Equation (19), the first-order derivatives of the current in Equation (14) are approximated with the current differences.

Equation 13

$$\theta = \frac{1}{2}\tan^{-1}\left(\frac{\Delta I_{\beta h2} - \Delta I_{\alpha h1}}{\Delta I_{\alpha h2} - \Delta I_{\beta h1}}\right) \quad (19)$$

If the count CNT=0, the detected currents $I_{\alpha h2}$, $I_{\alpha h1}$, and $I_{\alpha h0}$ represent the $\alpha$-axis components of the detected currents at the time t=T/4+nT, nT, and $-T/4+nT$, respectively. The detected currents $I_{\beta h2}$, $I_{\beta h1}$, and $I_{\beta h0}$ represent the $\beta$-axis components of the detected currents at the time t=T/4+nT, nT, and $-T/4+nT$, respectively.

If the count CNT=2, the magnetic pole position estimator 40 calculates the magnetic pole position $\theta$ based on following Equation (20) (Step S23). In Equation (20), the first-order derivatives of the current in Equation (15) are approximated with the current differences.

Equation 14

$$\theta = \frac{1}{2}\tan^{-1}\left(\frac{\Delta I_{\alpha h2} + \Delta I_{\beta h1}}{-\Delta I_{\beta h2} + \Delta I_{\alpha h1}}\right) \quad (20)$$

If the count CNT=2, the detected currents $I_{\alpha h2}$, $I_{\alpha h1}$, and $I_{\alpha h0}$ represent the α-axis components of the detected currents at the time t=T/2+nT, T/4+nT, and nT, respectively. The detected current $I_{\beta h2}$, $I_{\beta h1}$, and $I_{\beta h0}$ represent the β-axis components of the detected currents at the time t=T/2+nT, T/4+nT, and nT, respectively.

If the count CNT=3, the magnetic pole position estimator 40 calculates the magnetic pole position θ based on following Equation (21) (Step S24). In Equation (21), the first-order derivatives of the current in Equation (16) are approximated with the current differences.

Equation 15

$$\theta = \frac{1}{2}\tan^{-1}\left(\frac{-\Delta I_{\beta h2} + \Delta I_{\alpha h1}}{-\Delta I_{\alpha h2} - \Delta I_{\beta h1}}\right) \quad (21)$$

If the count CNT=3, the detected currents $I_{\alpha h2}$, $I_{\alpha h1}$, and $T_{\alpha h0}$ represent the α-axis components of the detected currents at the time t=3T/4+nT, T/2+nT, and T/4+nT, respectively. The detected current $I_{\beta h2}$, $I_{\beta h1}$, and $I_{\alpha h0}$ represent the β-axis components of the detected currents at the time t=3T/4+nT, T/2+nT, and T/4+nT, respectively.

As described above, the controlling apparatus 1 according to the first embodiment includes the superposed component generator 36 and the magnetic pole position estimator 40. The superposed component generator 36 generates a pilot voltage $V_h$ as a vector in a direction in parallel with the α axis or the β axis of the αβ axis coordinate system, and generates another pilot voltage $V_h$ of which vector direction is shifted by 90 degrees from the pilot voltage $V_h$ previously generated, at a predetermined cycle.

The pilot voltage $V_h$ generated in the superposed component generator 36 is superposed on the driving voltage reference as a superposed voltage reference, and input to the inverter 10. The inverter 10 then outputs a driving voltage to the electric motor 3 based on the driving voltage reference superposed with the superposed voltage reference. The magnetic pole position estimator 40 detects the currents flowing into the respective phases of the electric motor 3 at a predetermined cycle, and estimates the magnetic pole position θ of the electric motor 3 based on the change in the currents in the respective phases.

In the manner described above, the controlling apparatus 1 can generate a desired pilot voltage $V_h$ at a predetermined cycle, and can estimate the magnetic pole position θ based on the change in the currents in the respective phases of the electric motor 3.

The controlling apparatus 1 according to the first embodiment can therefore easily estimate the magnetic pole position θ without affecting the cycle at which the driving voltage reference for driving the electric motor 3 is updated. Furthermore, the magnetic pole position θ of the electric motor 3 can be estimated in three fourth of the cycle T from when the pilot voltage $V_h$ is started being superposed, and the estimation of the magnetic pole position θ of the electric motor 3 can be repeated once in every one fourth of the cycle T. Thus, the responsiveness of the magnetic pole position estimation can be improved.

Although the driving signal generator 39 uses the space vector modulation to generate the driving signals S1 to S6 for driving the inverter 10 in the example explained above, the driving signal generator 39 may use carrier comparison modulation (modulation for PWM) to generate the driving signals S1 to S6.

Figure 9:
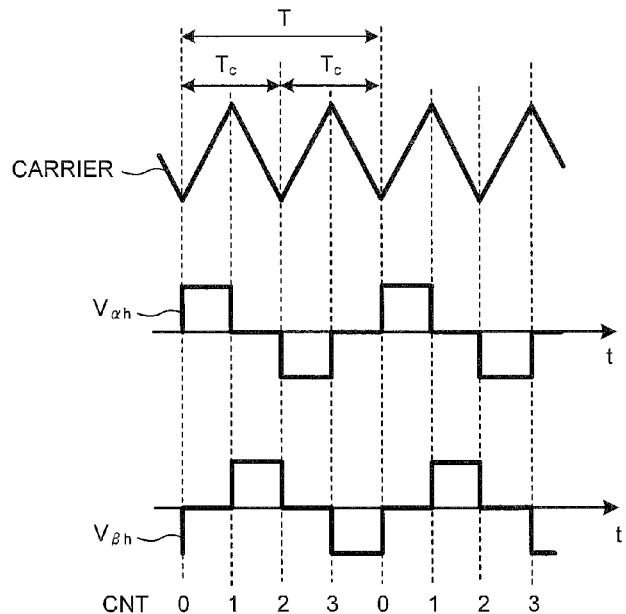
FIG. 9 is a schematic of a relation between the pilot voltage and a carrier.

In such a case, the count CNT is specified with a cycle T of twice the length of the carrier cycle $T_c$, and the counter 35 updates the count CNT based on four intervals in the cycle T. The counter 35 updates the count CNT at the timing of the peaks and the valleys of the carrier, as illustrated in FIG. 9. FIG. 9 is a schematic of a relation between the pilot voltage $V_h$ (the α-axis reference component $V_{\alpha h}$ and the β-axis reference component $V_{\beta h}$) and the carrier in an example in which the driving signal generator 39 generates the driving signals S1 to S6 using the carrier comparison modulation.

The superposed component generator 36 generates a pilot voltage $V_h$ that is to be superposed on the α-axis reference component $V_\alpha^*$ and the β-axis reference component $V_\beta^*$, using the cycle T=$2T_c$ as four intervals, based on the count CNT from the counter 35. Because the count CNT is changed at the peaks and the valleys of the carrier, the α-axis reference component $V_{\alpha h}$ and the β-axis reference component $V_{\beta h}$, of the pilot voltage $V_h$ are modified at the peaks and the valleys of the carrier, following the flowchart illustrated in FIG. 5.

The driving signal generator 39 calculates output voltage references $V_U^*$, $V_V^*$, and $V_W^*$ based on the α-axis reference component $V_{\alpha 1}^*$ and the β-axis reference component $V_{\alpha 1}^*$ received from the adder 37 and the adder 38, respectively. The driving signal generator 39 then compares the output voltage references $V_U^*$, $V_V^*$, and $V_W^*$ with the carrier in the cycle $T_c$, and generates the driving signals S1 to S6 that is a PWM signal, and output the signals to the inverter 10.

The magnetic pole position estimator 40 estimates the magnetic pole position θ of the electric motor 3 at each time of t=nT, T/4+nT, T/2+nT, and 3T/4+nT based on the count CNT received from the counter 35, following the flowchart illustrated in FIG. 8.

In this manner, the magnetic pole position θ of the electric motor 3 can be easily estimated, also when the driving signal generator 39 uses the carrier comparison modulation to generate the driving signals S1 to S6, in the same manner as when the space vector modulation is used to generate the driving signals S1 to S6.

In the examples described above, when the space vector modulation is used, the cycle T is set to $4T_V$, and when the carrier comparison modulation is used, the cycle T is set to $2T_c$. However, the length of the cycle T is not limited thereto. For example, a cycle T=$4mT_V$ (where, m is an integer equal to or more than two) may be used for the space vector modulation, and a cycle T=$2mT_c$ (where, m is an integer equal to or more than two) may be used for the carrier comparison modulation.

Furthermore, in the example explained above, the superposed component generator 36 generates a pilot voltage $V_h$ of which phase is shifted in the positive direction by 90 degrees at a predetermined cycle, but the way in which the pilot voltage $V_h$ is generated by the superposed component generator 36 is not limited thereto. For example, the superposed component generator 36 may also generate, at a predetermined cycle, a pilot voltage $V_h$ of which vector direction has a phase difference of 90 degrees in the negative direction in the αβ axis coordinate system. This configuration too can reduce the torque ripple, and can estimate the magnetic pole position θ of the electric motor 3 with a simpler operation.

Furthermore, the superposed component generator 36 may reverse the direction of the pilot voltage $V_h$ having a phase difference of 90 degrees from the positive direction to the negative direction, and vice versa, at a cycle mT (m is a natural number). This configuration too can reduce the torque ripple.

The superposed component generator 36 may generate a pilot voltage $V_h$ of which phase difference is alternated in the positive and the negative directions. In such a case, while the effect of torque ripple reduction is limited, the magnetic pole position estimator 40 can estimate the magnetic pole position θ based on the operations described above, so that the magnetic pole position θ can be easily estimated.

Furthermore, when the rotational speed of the electric motor 3 is low or moderate, the controlling apparatus 1 according to the first embodiment can ignore the induced voltage in the electric motor 3, so that Equation (7) approximating Equation (6) is used in the example above. When the rotational speed of the electric motor 3 is high, the magnetic pole position estimator 40 can estimate the magnetic pole position θ in the same manner, by providing a filter for removing the induced voltage component in the electric motor 3.

Furthermore, although the count CNT is output from the counter 35 to the superposed component generator 36 and to the magnetic pole position estimator 40 in the example explained above, each of the superposed component generator 36 and the magnetic pole position estimator 40 may be provided with a counter generating the count CNT.

Furthermore, although a configuration of a two-level inverter (FIG. 1) is provided as an example of the inverter 10 in the example explained above, a multi-level inverter such as a three-level inverter or a matrix inverter may also be used as the inverter 10, and other various modifications are still possible.

Second Embodiment

A controlling apparatus according to a second embodiment will now be explained. The controlling apparatus according to the second embodiment is different from the controlling apparatus 1 according to the first embodiment in that the superposed component generator generates the pilot voltage $V_h$ and the magnetic pole position estimator estimates the magnetic pole position θ in a different manner.

Figure 10:
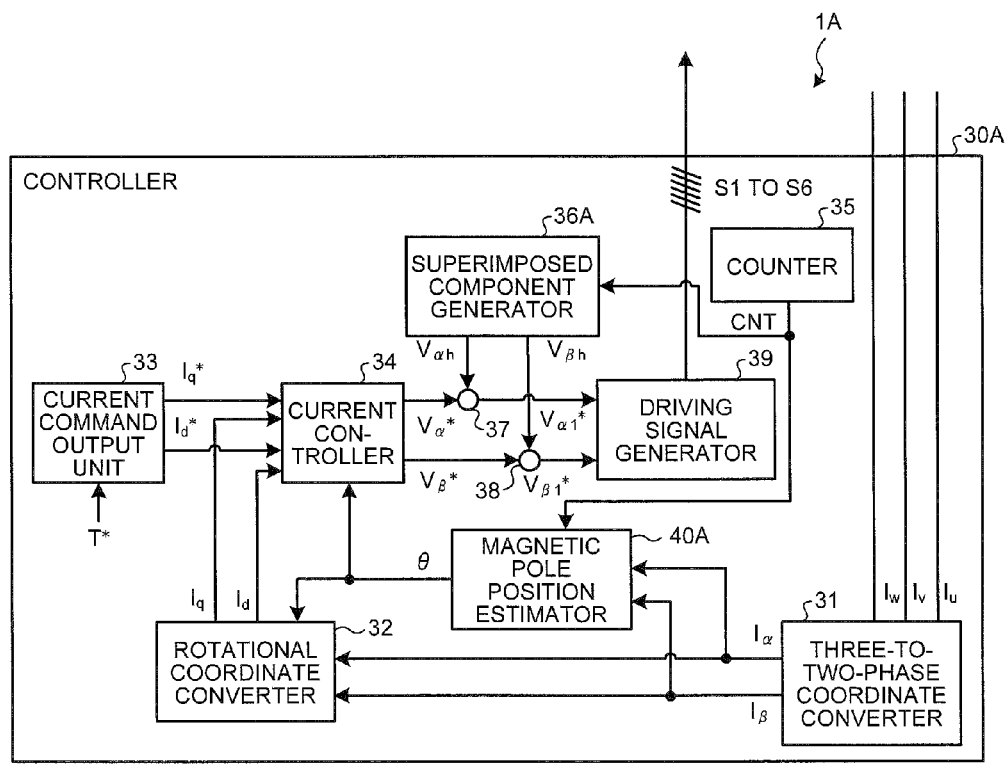
FIG. 10 is a schematic of a configuration of a controlling apparatus according to a second embodiment.

FIG. 10 is a schematic of a configuration of the controlling apparatus according to the second embodiment. In this controller 30A illustrated in FIG. 10, only the elements that are different from those in the controlling apparatus 1 according to the first embodiment are illustrated, and the other elements are omitted to avoid redundant explanations. The elements that are the same as those in the first embodiment are assigned with the same reference signs, and redundant explanations thereof are omitted as appropriate.

As illustrated in FIG. 10, the controlling apparatus 1A according to the second embodiment includes the three-to-two-phase coordinate converter 31, the rotational coordinate converter 32, the current reference output unit 33, the current controlling unit 34, the counter 35, a superposed component generator 36A, the adders 37 and 38, the driving signal generator 39, and a magnetic pole position estimator 40A. The controlling apparatus 1A has the same configuration as that of the controlling apparatus 1 according to the first embodiment except for the superposed component generator 36A and the magnetic pole position estimator 40A.

As described earlier, in the salient electric motor 3, the current-voltage equation in the αβ axis coordinate system set to the stator 3a in the electric motor 3 can be expressed as Equation (3) above. When the time between the two voltage vectors to be superposed is sufficiently shorter than the cycle of the driving voltage, the current-voltage equation indicated as Equation (3) with the component of the driving voltage frequency removed can be approximated as following Equation (22). Equation (22) is the same as Equation (8) above.

Equation 16

$$\frac{d}{dt}\begin{bmatrix} I_\alpha \\ I_\beta \end{bmatrix} = \frac{1}{L^2 - l^2}\begin{bmatrix} L - l\cos 2\theta & -l\sin 2\theta \\ -l\sin 2\theta & L + l\cos 2\theta \end{bmatrix}\begin{bmatrix} V_\alpha \\ V_\beta \end{bmatrix} \quad (22)$$

Equation (23) below can be given by taking time derivative of Equation (22) above.

Equation 17

$$\frac{d}{dt}\begin{bmatrix} V_\alpha \\ V_\beta \end{bmatrix} = \begin{bmatrix} L + l\cos 2\theta & l\sin 2\theta \\ l\sin 2\theta & L - l\cos 2\theta \end{bmatrix}\frac{d^2}{dt^2}\begin{bmatrix} I_\alpha \\ I_\beta \end{bmatrix} + K_e\frac{d}{dt}\begin{bmatrix} -\omega_r\sin\theta \\ \omega_r\cos\theta \end{bmatrix} \quad (23)$$

If the rotational acceleration of the electric motor 3 is sufficiently smaller than the first term in the right-hand side of Equation (23), Equation (23) can be approximated as following Equation (24).

Equation 18

$$\frac{d}{dt}\begin{bmatrix} V_\alpha \\ V_\beta \end{bmatrix} = \begin{bmatrix} L + l\cos 2\theta & l\sin 2\theta \\ l\sin 2\theta & L - l\cos 2\theta \end{bmatrix}\frac{d^2}{dt^2}\begin{bmatrix} I_\alpha \\ I_\beta \end{bmatrix} \quad (24)$$

Equation (24) can be rewritten for the current as Equation (25).

Equation 19

$$\frac{d^2}{dt^2}\begin{bmatrix} I_\alpha \\ I_\beta \end{bmatrix} = \frac{1}{L^2 - l^2}\begin{bmatrix} L - l\cos 2\theta & -l\sin 2\theta \\ -l\sin 2\theta & L + l\cos 2\theta \end{bmatrix}\frac{d}{dt}\begin{bmatrix} V_\alpha \\ V_\beta \end{bmatrix} \quad (25)$$

Figure 11:
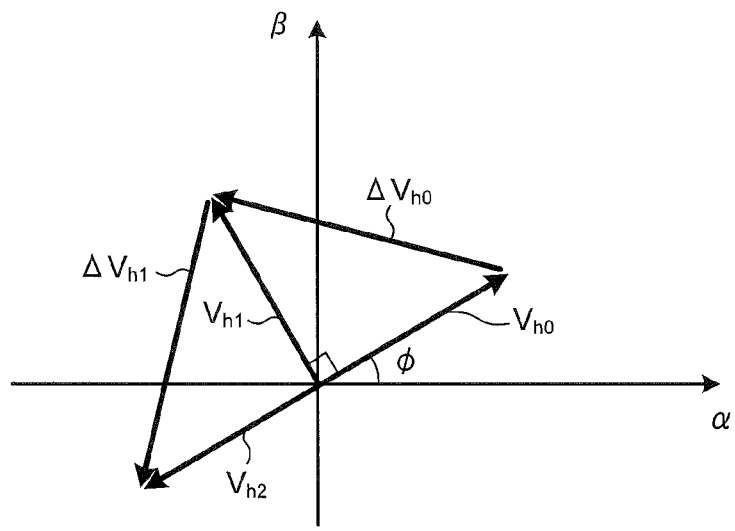
FIG. 11 is a schematic of an example of a relation between a voltage vectors and $\phi$ in the second embodiment.

Now consider how the pilot voltage $V_h$ is to be included in the driving voltage that is based on the q-axis voltage reference $V_q^*$ and the d-axis voltage reference $V_d^*$ that are driving voltage references, as an output voltage from the inverter 10. For example, as illustrated in FIG. 11, the voltage vectors $V_{h0}$, $V_{h1}$, and $V_{h2}$ in the αβ axis coordinate system are superposed, in the order listed herein, at a predetermined cycle. FIG. 11 is a schematic of an example of a relation between the voltage vectors $V_{h0}$, $V_{h1}$, $V_{h2}$ and φ in the αβ axis coordinate system.

The voltage vector $V_{h0}$ is a vector of which phase difference is φ degrees in the positive direction of the α axis. The voltage vector $V_{h1}$ is a vector of which phase difference is φ+90 degrees in the positive direction of the α axis. The voltage vector $V_{h2}$ is a vector of which phase difference is φ+180 degrees in the positive direction of the α axis. The voltage vectors $V_{h0}$, $V_{h1}$, and $V_{h2}$ are vectors with an amplitude $V_{inj2}$ (>0).

The difference vector $\Delta V_{h0}$ (=$V_{h0}-V_{h1}$) between the voltage vector $V_{h0}$ and the voltage vector $V_{h1}$ is expressed as following Equation (26), and difference vector $\Delta V_{h1}$ (=$V_{h1}-V_{h2}$) between the voltage vector $V_{h1}$ and the voltage vector $V_{h2}$ is expressed as following Equation (27).

Equation 20

$$\Delta V_{h0} = \sqrt{2} \begin{bmatrix} -V_{inj2}\sin(\phi + \frac{\pi}{4}) \\ V_{inj2}\cos(\phi + \frac{\pi}{4}) \end{bmatrix} \quad (26)$$

$$\Delta V_{h1} = \sqrt{2} \begin{bmatrix} -V_{inj2}\cos(\phi + \frac{\pi}{4}) \\ -V_{inj2}\sin(\phi + \frac{\pi}{4}) \end{bmatrix} \quad (27)$$

Here, the time at which the voltage vector $V_{h0}$ is superposed is time $t_{h0}$, the time at which the voltage vector $V_{h1}$ is superposed is time $t_{h1} = t_{h0} + \Delta t$, and the time at which the voltage vector $V_{h0}$ is superposed is $t_{h2} = t_{h0} + 2\Delta t$. The vectors of the voltage derivatives are approximated with difference vectors. In this case, based on the difference vectors indicated in Equations (26) and (27), the current-voltage equations at the time $t_{h1}$ and the time $t_{h2}$ can be expressed as Equation (28) and Equation (29), respectively.

Equation 21

$$\frac{d^2}{dt^2}\begin{bmatrix} I_\alpha|_{t=t_{h1}} \\ I_\beta|_{t=t_{h1}} \end{bmatrix} = \quad (28)$$

$$\frac{\sqrt{2}V_{inj2}}{(L^2-l^2)\Delta t}\begin{bmatrix} -(L-l\cos2\theta)\sin(\phi+\frac{\pi}{4}) - l\sin2\theta\cdot\cos(\phi+\frac{\pi}{4}) \\ l\sin2\theta\cdot\sin(\phi+\frac{\pi}{4}) + (L+l\cos2\theta)\cos(\phi+\frac{\pi}{4}) \end{bmatrix}$$

$$\frac{d^2}{dt^2}\begin{bmatrix} I_\alpha|_{t=t_{h2}} \\ I_\beta|_{t=t_{h2}} \end{bmatrix} = \quad (29)$$

$$\frac{\sqrt{2}V_{inj2}}{(L^2-l^2)\Delta t}\begin{bmatrix} -(L-l\cos2\theta)\cos(\phi+\frac{\pi}{4}) + l\sin2\theta\cdot\sin(\phi+\frac{\pi}{4}) \\ l\sin2\theta\cdot\cos(\phi+\frac{\pi}{4}) - (L+l\cos2\theta)\sin(\phi+\frac{\pi}{4}) \end{bmatrix}$$

The relation in following Equation (30) can be given based on Equations (28) and (29).

Equation 22

$$\begin{bmatrix} 2l\cos(\phi+\frac{\pi}{4}) & -2l\sin(\phi+\frac{\pi}{4}) \\ 2l\sin(\phi+\frac{\pi}{4}) & 2l\cos(\phi+\frac{\pi}{4}) \end{bmatrix}\begin{bmatrix} \sin2\theta \\ \cos2\theta \end{bmatrix} = \quad (30)$$

$$\frac{L^2-l^2}{V_{inj2}}\begin{bmatrix} \frac{d^2}{dt^2}I_\beta|_{t=t_{h2}} & -\frac{d^2}{dt^2}I_\alpha|_{t=t_{h1}} \\ \frac{d^2}{dt^2}I_\alpha|_{t=t_{h2}} & +\frac{d^2}{dt^2}I_\beta|_{t=t_{h1}} \end{bmatrix}$$

Equation (30) above can be rewritten for the magnetic pole position $\theta$ of the electric motor 3 as Equation (31). Therefore, by detecting a change in the currents in the respective phases at the time $t_{h1}$ and the time $t_{h2}$, the magnetic pole position $\theta$ of the electric motor 3 can be estimated.

Equation 23

$$\theta = \frac{1}{2}\tan^{-1}\left\{\frac{\cos(\phi+\frac{\pi}{4})\left(\frac{d^2}{dt^2}I_\beta|_{t=t_{h2}} - \frac{d^2}{dt^2}I_\alpha|_{t=t_{h1}}\right) + \sin(\phi+\frac{\pi}{4})\left(\frac{d^2}{dt^2}I_\alpha|_{t=t_{h2}} + \frac{d^2}{dt^2}I_\beta|_{t=t_{h1}}\right)}{-\sin(\phi+\frac{\pi}{4})\left(\frac{d^2}{dt^2}I_\beta|_{t=t_{h2}} - \frac{d^2}{dt^2}I_\alpha|_{t=t_{h1}}\right) + \cos(\phi+\frac{\pi}{4})\left(\frac{d^2}{dt^2}I_\alpha|_{t=t_{h2}} + \frac{d^2}{dt^2}I_\beta|_{t=t_{h1}}\right)}\right\} \quad (31)$$

When $\phi$ is set to one of 45 degrees, 135 degrees, 225 degrees, and 315 degrees, the magnetic pole position $\theta$ of the electric motor 3 can be estimated with a simpler operation, in the manner described below. In other words, Equation (31) can be expressed as Equation (32) below when $\phi$=45 degrees, as Equation (33) below when $\phi$=135 degrees, as Equation (34) below when $\phi$=225 degrees, and as Equation (35) below when $\phi$=315 degrees.

Equation 24

$$\theta = \frac{1}{2}\tan^{-1}\left(\frac{\frac{d^2}{dt^2}I_\alpha|_{t=t_{h2}} + \frac{d^2}{dt^2}I_\beta|_{t=t_{h1}}}{-\frac{d^2}{dt^2}I_\beta|_{t=t_{h2}} + \frac{d^2}{dt^2}I_\beta|_{t=t_{h1}}}\right) \quad (23)$$

$$\theta = \frac{1}{2}\tan^{-1}\left(\frac{-\frac{d^2}{dt^2}I_\beta|_{t=t_{h2}} + \frac{d^2}{dt^2}I_\alpha|_{t=t_{h1}}}{-\frac{d^2}{dt^2}I_\alpha|_{t=t_{h2}} - \frac{d^2}{dt^2}I_\beta|_{t=t_{h1}}}\right) \quad (24)$$

$$\theta = \frac{1}{2}\tan^{-1}\left(\frac{-\frac{d^2}{dt^2}I_\alpha|_{t=t_{h2}} - \frac{d^2}{dt^2}I_\beta|_{t=t_{h1}}}{\frac{d^2}{dt^2}I_\beta|_{t=t_{h2}} - \frac{d^2}{dt^2}I_\alpha|_{t=t_{h1}}}\right) \quad (25)$$

$$\theta = \frac{1}{2}\tan^{-1}\left(\frac{\frac{d^2}{dt^2}I_\beta|_{t=t_{h2}} - \frac{d^2}{dt^2}I_\alpha|_{t=t_{h1}}}{\frac{d^2}{dt^2}I_\alpha|_{t=t_{h2}} + \frac{d^2}{dt^2}I_\beta|_{t=t_{h1}}}\right) \quad (26)$$

Therefore, the voltage vector $V_{h0}$ of which $\phi$ is one of 45 degrees, 135 degrees, 225 degrees, and 315 degrees is superposed, and the voltage vector $V_{h1}$ of which phase is shifted by 90 degrees with respect to the voltage vector $V_{h0}$ is then superposed after a specified time period has elapsed. When another specified time period has elapsed, the voltage vector $V_{h2}$ of which phase is shifted by 90 degrees with respect to the voltage vector $V_{h1}$ is superposed. In this manner, the magnetic pole position $\theta$ of the electric motor 3 can be estimated with a simpler operation.

In the example explained above, the voltage vector $V_{h1}$ of which phase difference is $\phi$+90 degrees in the positive direction of the $\alpha$ axis is superposed at the time $t_{h1}$, the voltage vector $V_{h1}$ of which phase difference is $\phi$+180 degrees in the positive direction of the $\alpha$ axis is superposed at the time $t_{h2}$, but without limitation. For example, a voltage vector $V_{h1}$ of which phase is shifted by $\phi$−90 degrees in the positive direction of the $\alpha$ axis may be superposed at the time $t_{h1}$, and a voltage vector $V_{h1}$ of which phase is shifted by $\phi$−180 degrees in the positive direction of the $\alpha$ axis may be superposed at the time $t_{h2}$. In this manner, the magnetic pole position $\theta$ of the electric motor 3 can be estimated with a simpler operation.

In the manner described above, the voltage vector $V_{h0}$ of which $\phi$ is one of 0 degrees, 90 degrees, 180 degrees, and 270 degrees is superposed at the time $t_{h0}$, and the voltage vector $V_{h1}$ at $\phi+90$ degrees (or $\phi-90$ degrees) is then superposed at the time $t_{h1}$. The voltage vector $V_{h2}$ at $\phi+180$ degrees (or $\phi-180$ degrees) is then superposed at the time $t_{h2}$. A second-order difference is then detected from a change in the currents in the respective phases from the time $t_{h0}$ to the time $t_{h1}$, and from a change in the currents in the respective phases from the time $t_{h1}$ to the time $t_{h2}$. In this manner, the magnetic pole position $\theta$ of the electric motor 3 can be estimated with simple operations, such as Equations (32) to (35) above.

The superposed component generator 36A, therefore, generates a pilot voltage $V_h$ of which cycle is $T=4T_V$, as indicated in Equation (36), and superposes the pilot voltage $V_h$ on driving voltage references that are defined by the $\alpha$-axis reference component $V_\alpha^*$ and the $\beta$-axis reference component $V_\beta^*$, respectively. $T_V$ is the update cycle of the driving signal generator 39 performing the space vector modulation.

Equation 25

$$\begin{bmatrix} V_{\alpha h} \\ V_{\beta h} \end{bmatrix} = \tag{36}$$

$$\begin{cases} [V_{inj2} \quad V_{inj2}]^T, & nT < t \leq T/4 + nT & \text{(Time Period } E) \\ [-V_{inj2} \quad V_{inj2}]^T, & T/4 + nT < t \leq T/2 + nT & \text{(Time Period } F) \\ [-V_{inj2} \quad -V_{inj2}]^T, & T/2 + nT < t \leq 3T/4 + nT & \text{(Time Period } G) \\ [V_{inj2} \quad -V_{inj2}]^T, & 3T/4 + nT < t \leq (n+1)T & \text{(Time Period } H) \end{cases}$$

Figure 12:
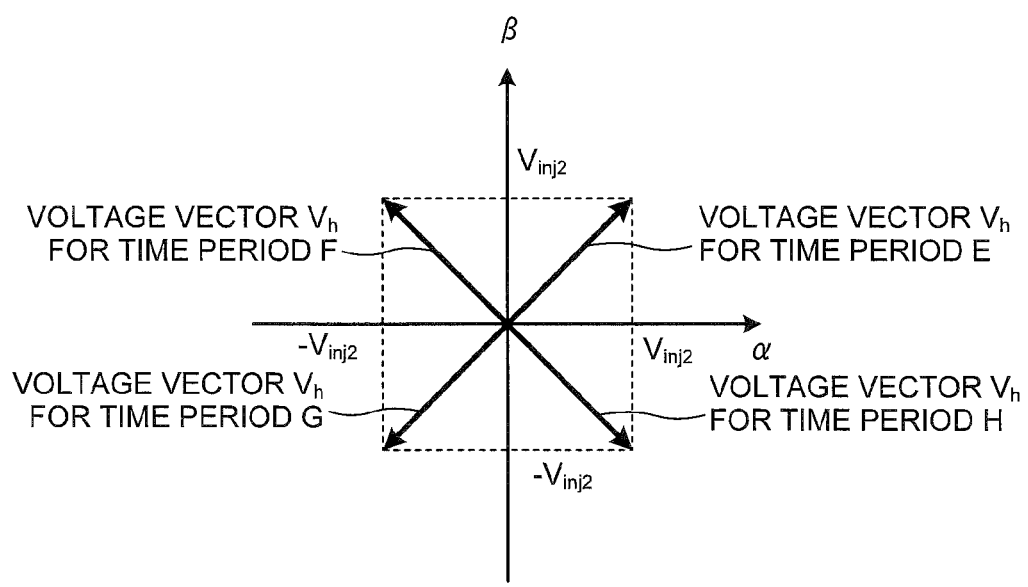
FIG. 12 is a schematic of a change in the pilot voltage in a cycle in the second embodiment.

By causing the superposed component generator 36A to output the pilot voltage $V_h$ as expressed in Equation (36), a pilot voltage $V_h$ in directions cancelling out each other in the $\alpha$ axis and the $\beta$ axis can be output, as illustrated in FIG. 12. FIG. 12 is a schematic of a change of the pilot voltage $V_h$ in the cycle T. In this manner, the voltage in the cycle T can be averaged to zero, so that the torque ripple can be reduced.

Figure 13:
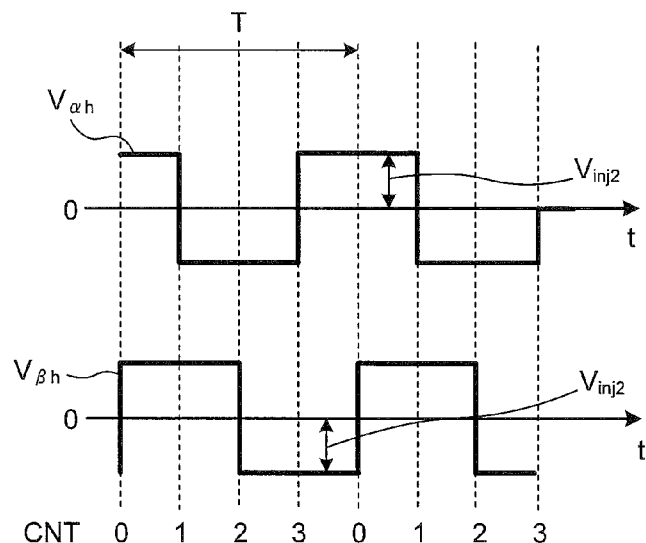
FIG. 13 is a schematic of a change in an $\alpha$-axis component and a $\beta$-axis component of the pilot voltage according to the second embodiment.
Figure 14:
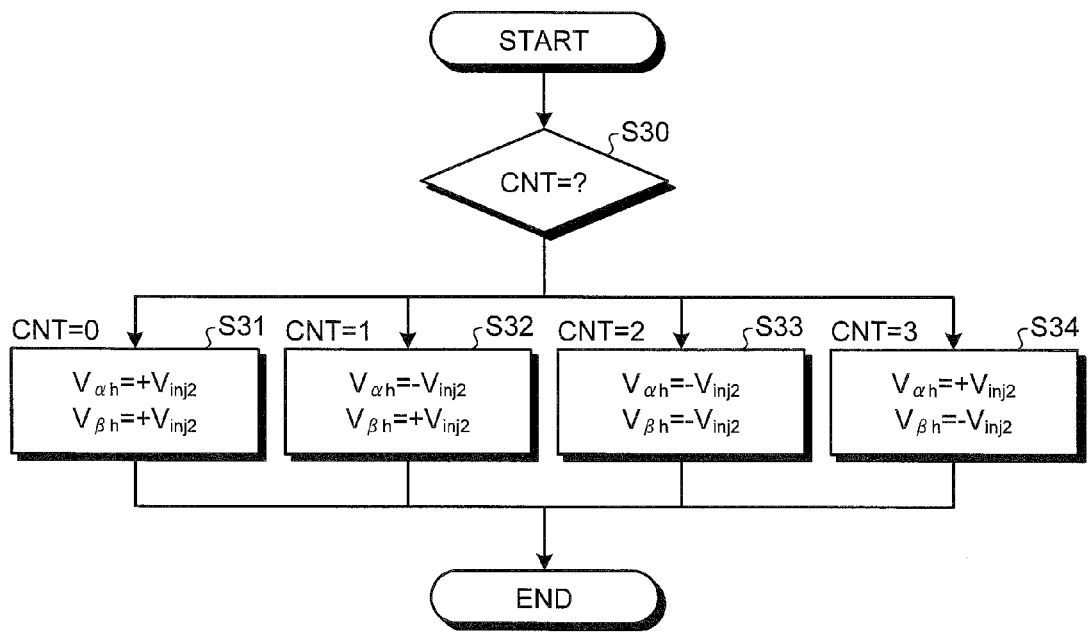
FIG. 14 is a flowchart illustrating a pilot voltage generating process performed by a superposed component generator according to the second embodiment.

A configuration and an operation of the superposed component generator 36A will now be explained more specifically with reference to FIGS. 13 and 14. FIG. 13 is a schematic illustrating a change in $V_{\alpha h}$ and $V_{\beta h}$ that are the $\alpha$-axis and the $\beta$-axis components of the pilot voltage $V_h$ output from the superposed component generator 36A. FIG. 14 is a flow-chart illustrating a pilot voltage generating process performed by the superposed component generator 36A.

As illustrated in FIG. 13, the superposed component generator 36A generates an $\alpha$-axis reference component $V_{\alpha h}$ and a $\beta$-axis reference component $V_{\beta h}$ that are the $\alpha$-axis component and the $\beta$-axis component of the pilot voltage $V_{\alpha h}$, based on the count CNT of the counter 35 that sequentially outputs zero, one, two, three as the count CNT.

Specifically, as illustrated in FIG. 14, the superposed component generator 36A determines the count CNT of the counter 35 (Step S30). If the count CNT=0, the superposed component generator 36A generates a pilot voltage $V_h$ of which $V_{\alpha h}=+V_{inj2}$ and $V_{\beta h}=+V_{inj2}$, and outputs these components to the adder 37 and to the adder 38, respectively (Step S31). If the count CNT=1, the superposed component generator 36A generates a pilot voltage $V_h$ of which $V_{\alpha h}=-V_{inj2}$ and $V_{\beta h}=+V_{inj2}$, and outputs these components to the adder 37 and to the adder 38, respectively (Step S32).

If the count CNT=2, the superposed component generator 36A generates a pilot voltage $V_h$ of which $V_{\alpha h}=-V_{inj2}$ and $V_{\beta h}=-V_{inj2}$, and outputs these components to the adder 37 and to the adder 38, respectively (Step S33). If the count CNT=3, the superposed component generator 36A generates a pilot voltage $V_h$ of which $V_{\alpha h}=+V_{inj2}$ and $V_{\beta h}=-V_{inj2}$, and outputs these components to the adder 37 and to the adder 38, respectively (Step S34).

In this manner, the superposed component generator 36 repeatedly generates a pilot voltage $V_h$ of which phase difference with respect to the pilot voltage $V_h$ previously generated is in a direction of 90 degrees in the $\alpha\beta$ axis coordinate system at the cycle $T_V$. The superposed component generator 36A may also repeatedly generate a pilot voltage $V_h$ of which phase difference with respect to the pilot voltage $V_h$ previously generated is in a direction of $-90$ degrees in the $\alpha\beta$ axis coordinate system, at the cycle $T_V$.

The magnetic pole position estimator 40A estimates the magnetic pole position $\theta$ at the time $t=nT$ ($n=1, 2, 3, \ldots$), the magnetic pole position $\theta$ at the time $t=T/4+nT$, the magnetic pole position $\theta$ at the time $t=T/2+nT$, and the magnetic pole position $\theta$ at the time $t=3T/4+nT$.

Figure 15:
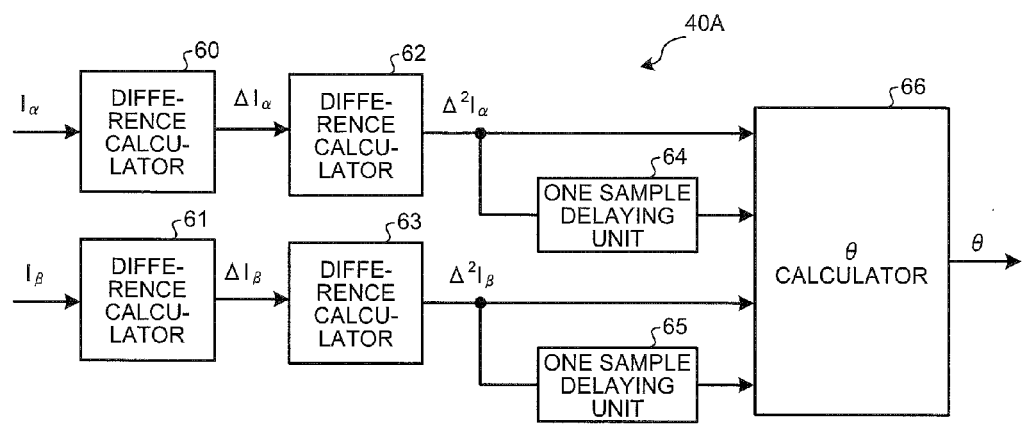
FIG. 15 is a schematic of a configuration of a magnetic pole position estimator according to the second embodiment.

FIG. 15 is a schematic of a configuration of the magnetic pole position estimator 40A. As illustrated in FIG. 15, the magnetic pole position estimator 40A includes difference calculators 60 to 63 (an example of a current difference calculator), one sample delaying units 64 and 65, and a $\theta$ calculator 66 (an example of a magnetic pole position calculator), and operates with a sampling cycle of T/4.

The difference calculator 60 acquires an $\alpha$-axis component detected current $I_\alpha$ from the three-to-two-phase coordinate converter 31, and calculates and outputs a difference $\Delta I_\alpha$ between the detected current $I_\alpha$ and another detected current $I_\alpha$ acquired at the previous sampling time (=T/4). The difference calculator 61 acquires the n-axis component detected current $I_\beta$ from the three-to-two-phase coordinate converter 31, and calculates and outputs a difference $\Delta I_\beta$ between the detected current $I_\beta$ and the detected current $I_\beta$ acquired at the time T/4 before.

The difference calculator 62 acquires the difference $\Delta I_\alpha$ from the difference calculator 60, and calculates and outputs the second-order difference $\Delta^2 I_\alpha$ between the difference $\Delta I_\alpha$ and the difference $\Delta I_\alpha$ acquired at the previous sampling time. The difference calculator 63 acquires the difference $\Delta I_\beta$ from the difference calculator 61, and calculates and outputs the second-order difference $\Delta^2 I_\beta$ between the difference $\Delta I_\alpha$ and the difference $\Delta I_\beta$ acquired at the previous sampling time.

The one sample delaying unit 64 delays the second-order difference $\Delta^2 I_\alpha$ received from the difference calculator 62 by one sampling time, and outputs the second-order difference to the $\theta$ calculator 66. The one sample delaying unit 65 delays the second-order difference $\Delta^2 I_\beta$ received from the difference calculator 63 by one sampling time, and outputs the second-order difference to the $\theta$ calculator 66.

The $\theta$ calculator 66 estimates the magnetic pole position $\theta$ based on the second-order differences $\Delta^2 I_\alpha$ and $\Delta^2 I_\beta$ output from the difference calculators 62 and 63, respectively, and the second-order differences $\Delta^2 I_\alpha$ and $\Delta^2 I_\beta$ belonging to the previous sampling time output from the one sample delaying units 64 and 65, respectively.

Figure 16:
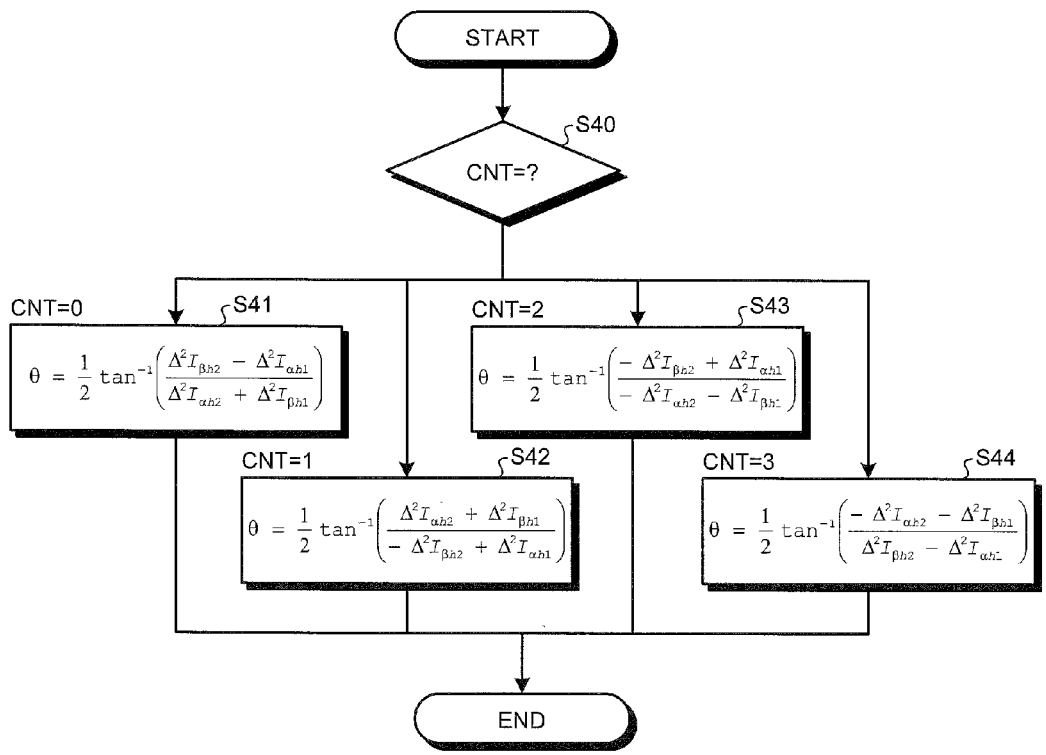
FIG. 16 is a flowchart illustrating a magnetic pole position estimating process performed by a magnetic pole position estimator according to the second embodiment.

FIG. 16 is a flowchart illustrating a magnetic pole position estimating process performed by the magnetic pole position estimator 40A. Hereunder, $\Delta^2 I_{\alpha h2}=\Delta I_{\alpha h2}-\Delta I_{\alpha h1}$, $\Delta^2 I_{\beta h2}=\Delta I_{\beta h2}-\Delta I_{\beta h1}$, $\Delta^2 I_{\alpha h1}=\Delta I_{\alpha h1}-\Delta I_{\alpha h0}$, and $\Delta^2 I_{\beta h2}=\Delta I_{\beta h1}-\Delta I_{\beta h0}$. Furthermore, $\Delta I_{\alpha h2}=I_{\alpha h2}-I_{\alpha h1}$, $\Delta I_{\beta h2}=I_{\beta h2}-I_{\beta h1}$, $\Delta I_{\alpha h1}=I_{\alpha h1}-I_{\alpha h0}$, $\Delta I_{\beta h1}=I_{\beta h0}-I_{\beta h0}$, $\Delta I_{\alpha h0}=I_{\alpha h0}-I_{\alpha h1}$, and $\Delta I_{\beta h0}=I_{\beta h0}-I_{\beta h-1}$.

As illustrated in FIG. 16, the magnetic pole position estimator 40A determines the count CNT of the counter 35 (Step S40).

If the count CNT=0, the magnetic pole position estimator 40A estimates the magnetic pole position $\theta$ of the electric motor 3 based on following Equation (37) (Step S41). In Equation (37), the second-order derivatives of the current in Equation (32) are approximated with the current differences.

Equation 26

$$\theta = \frac{1}{2}\tan^{-1}\left(\frac{\Delta^2 I_{\beta h2} - \Delta^2 I_{\alpha h1}}{\Delta^2 I_{\alpha h2} + \Delta^2 I_{\beta h1}}\right) \quad (37)$$

If the count CNT=0, the detected currents $I_{\alpha h2}$, $I_{\alpha h1}$, $I_{\alpha h0}$, and $I_{\alpha h-1}$ represent the α-axis components of the detected currents at the time t=nT, −T/4+nT, −T/2+nT, and −3T/4+nT, respectively. The detected currents $I_{\beta h2}$, $I_{\beta h1}$, $I_{\beta h0}$, and $I_{\beta h-1}$ represent the β-axis components of the detected currents at the time t=nT, −T/4+nT, −T/2+nT, and −3T/4+nT, respectively.

If the count CNT=1, the magnetic pole position estimator 40A estimates the magnetic pole position θ of the electric motor 3 based on following Equation (38) (Step S42). In Equation (38), the second-order derivatives of the current in Equation (33) are approximated with the current differences.

Equation 27

$$\theta = \frac{1}{2}\tan^{-1}\left(\frac{\Delta^2 I_{\alpha h2} + \Delta^2 I_{\beta h1}}{-\Delta^2 I_{\beta h2} + \Delta^2 I_{\alpha h1}}\right) \quad (38)$$

If the count CNT=1, the detected currents $I_{\alpha h2}$, $I_{\alpha h1}$, $I_{\alpha h0}$, and $I_{\alpha h-1}$ represent the α-axis components of the detected currents at the time t=T/4+nT, nT, −T/4+nT, and −T/2+nT, respectively. The detected currents $I_{\beta h2}$, $I_{\beta h1}$, $I_{\beta h0}$, and $I_{\beta h-1}$ represent the β-axis components of the detected currents at the time t=T/4+nT, nT, −T/4+nT, and −T/2+nT, respectively.

If the count CNT=2, the magnetic pole position estimator 40A estimates the magnetic pole position θ of the electric motor 3 based on following Equation (39) (Step S43). In Equation (39), the second-order derivatives of the current in Equation (34) are approximated with the current differences.

Equation 28

$$\theta = \frac{1}{2}\tan^{-1}\left(\frac{-\Delta^2 I_{\beta h2} + \Delta^2 I_{\alpha h1}}{-\Delta^2 I_{\alpha h2} - \Delta^2 I_{\beta h1}}\right) \quad (39)$$

If the count CNT=2, the detected currents $I_{\alpha h2}$, $I_{\alpha h1}$, $I_{\alpha h0}$, and $I_{\alpha h-1}$ represent the α-axis components of the detected currents at the time t=T/2+nT, T/4+nT, nT, and −T/4+nT, respectively. The detected currents $I_{\beta h2}$, $I_{\beta h1}$, $I_{\beta h0}$, and $I_{\beta h-1}$ represent the β-axis components of the detected currents at the time t=T/2+nT, T/4+nT, nT, and −T/4+nT, respectively.

If the count CNT=3, the magnetic pole position estimator 40A estimates the magnetic pole position θ of the electric motor 3 based on following Equation (40) (Step S44). In Equation (40), the second-order derivatives of the current in Equation (35) are approximated with the current differences.

Equation 29

$$\theta = \frac{1}{2}\tan^{-1}\left(\frac{-\Delta^2 I_{\alpha h2} - \Delta^2 I_{\beta h1}}{\Delta^2 I_{\beta h2} - \Delta^2 I_{\alpha h1}}\right) \quad (40)$$

If the count CNT=3, detected currents $I_{\alpha h2}$, $I_{\alpha h1}$, $I_{\alpha h0}$, and $I_{\alpha h-1}$ represent the α-axis components of the detected currents at the time t=3T/4+nT, T/2+nT, T/4+nT, and nT respectively. The detected current $I_{\beta h2}$, $I_{\beta h1}$, $I_{\beta h0}$, and $I_{\beta h-1}$ represent the β-axis components of the detected currents at the time t=3T/4+nT, T/2+nT, T/4+nT, and nT, respectively.

At Steps S41 to S44, the magnetic pole position estimator 40A estimates the magnetic pole position θ of the electric motor 3 by performing the operations of Equations (37) to (40) by setting the differences $\Delta^2 I_\alpha$ and $\Delta^2 I_\beta$ output from the difference calculators 62 and 63, respectively, to $\Delta^2 i_{\beta h1}$ and $\Delta^2 i_{\beta h1}$, respectively, and setting the differences $\Delta^2 I_\alpha$ and $\Delta^2 I_\beta$ belonging to a previous sampling time output from the one sample delaying units 64 and 65, respectively, to $\Delta^2{}_{i\alpha h2}$ and $\Delta^2{}_{i\beta h2}$, respectively.

In the manner described above, the controlling apparatus 1A according to the second embodiment includes the superposed component generator 36A and the magnetic pole position estimator 40A. The superposed component generator 36A generates a pilot voltage $V_h$ as a vector with a phase shifted by 45 degrees with respect to the α axis or the β axis of the αβ axis coordinate system, and generates a pilot voltage $V_h$ of which vector direction is shifted by 90 degrees with respect to the pilot voltage $V_h$ previously generated, at a predetermined cycle.

The magnetic pole position estimator 40A can therefore estimate the magnetic pole position θ with an simple operation, without affecting the cycle at which the driving voltage reference for driving the electric motor 3 is updated. Furthermore, the magnetic pole position θ of the electric motor 3 can be estimated at the cycle T from when the pilot voltage $V_h$ is started being superposed, and the estimation of the magnetic pole position θ of the electric motor 3 can be repeated every one fourth of the cycle T. The responsiveness of the magnetic pole position estimation can therefore be improved.

Although the driving signal generator 39 uses the space vector modulation to generate the driving signals S1 to S6 for driving the inverter 10 in the example explained above, the driving signal generator 39 may also use carrier comparison modulation, in the same manner as explained in the first embodiment. In such a case, the count CNT is specified with a cycle T of twice the length of the carrier cycle $T_c$, and the counter 35 updates the count CNT based on four intervals in the cycle T. The counter 35 updates the count CNT at the timing of the peaks and the valleys of the carrier.

The other modifications explained in the section of the first embodiment are also applicable to the controlling apparatus 1A according to the second embodiment.

Those skilled in the art will be capable of easily finding more advantageous effects and variations. A wider scope of the present invention is not limited to the specifically detailed and representative embodiments that are expressed and described herein. Various modifications are therefore still possible within the comprehensive spirit and scope of the present invention that is defined by the appended claims and the equivalent.

What is claimed is:

1. A controlling apparatus for an electric motor, the controlling apparatus comprising:

a superposed component generator configured to generate, at a predetermined cycle, a superposed voltage reference of which vector is shifted by 90 degrees with respect to that of a superposed voltage reference previously generated, in a coordinate system that is set to a stator of the electric motor;

an inverter configured to output a driving voltage that is based on a driving voltage reference superposed with the superposed voltage reference to the electric motor;

a current detector configured to detect currents flowing into respective phases of the electric motor, and output the detected currents; and a magnetic pole position estimator configured to detect a magnetic pole position of the electric motor based on an amount of change in the detected currents at the predetermined cycle.

2. The controlling apparatus for the electric motor according to claim 1, wherein the superposed component generator repeatedly generates the superposed voltage reference so that a vector of the superposed voltage reference is shifted by 90 degrees with respect to that of the superposed voltage reference previously generated in positive or negative directions in the coordinate system.

3. The controlling apparatus for the electric motor according to claim 2, wherein
two axes of the coordinate system represent orthogonal coordinate axes of an $\alpha$ axis and a $\beta$ axis, and
an orientation of the vector of the superposed voltage reference is in parallel with the $\alpha$ axis or the $\beta$ axis.

4. The controlling apparatus for the electric motor according to claim 3, wherein
the current detector converts the currents flowing into the respective phases of the electric motor into detected currents in the coordinate system, and outputs the converted detected currents, and
the magnetic pole position estimator comprises:
a current difference calculator configured to calculate first-order differences of the detected currents output from the current detector; and
a magnetic pole position calculator configured to calculate a magnetic pole position of the electric motor based on the first-order differences.

5. The controlling apparatus for the electric motor according to claim 2, wherein
axes of the coordinate system represent orthogonal coordinate axes of an $\alpha$ axis and a $\beta$ axis,
an orientation of the vector of the superposed voltage reference is phase-shifted by 45 degrees with respect to the $\alpha$ axis or the $\beta$ axis.

6. The controlling apparatus for the electric motor according to claim 5, wherein
the current detector converts the currents flowing into the respective phases of the electric motor into detected currents in the coordinate system, and outputs the converted detected currents, and
the magnetic pole position estimator comprises:
a current difference calculator configured to calculate second-order differences of the detected currents output from the current detector; and
a magnetic pole position calculator configured to calculate a magnetic pole position of the electric motor based on the second-order differences.

7. The controlling apparatus for the electric motor according to claim 1, further comprising:
a driving signal generator that generates, based on the driving voltage reference superposed with the superposed voltage reference, a plurality of driving signals that are different in a cycle, for each driving voltage reference using space vector modulation, and outputs the driving signals to the inverter, wherein
the predetermined cycle is n/2 times of the cycle of the driving signal generator, wherein n is a natural number.

8. The controlling apparatus for the electric motor according to claim 1, further comprising:
a driving signal generator that generates a driving signal using carrier comparison modulation that is based on a comparison between a driving voltage reference superposed with the superposed voltage reference and a carrier, and outputs the driving signal to the inverter, wherein
the predetermined cycle is m times of a cycle of peaks and valleys of the carrier, wherein m is a natural number.

9. The controlling apparatus for the electric motor according to claim 1, wherein the electric motor is an interior permanent magnet synchronous motor.

10. A magnetic pole position estimating apparatus for an electric motor, the magnetic pole position estimating apparatus comprising:
a superposed component generator configured to generate, at a predetermined cycle, a superposed voltage reference of which vector is shifted by 90 degrees with respect to that of a superposed voltage reference previously generated, in a coordinate system that is set to a stator of the electric motor;
a current detector configured to detect currents flowing into respective phases of the electric motor that is driven based on a driving voltage reference superposed with the superposed voltage reference, and outputs the detected currents; and
a magnetic pole position estimator configured to detect a magnetic pole position of the electric motor based on an amount of change in the detected currents at the predetermined cycle.

11. A magnetic pole position estimating method for an electric motor, the magnetic pole position estimating method comprising:
generating, at a predetermined cycle, a superposed voltage reference of which vector is shifted by 90 degrees with respect to that of a superposed voltage reference previously generated, in a coordinate system that is set to a stator of the electric motor;
detecting currents flowing into respective phases of the electric motor that is driven based on a driving voltage reference superposed with the superposed voltage reference; and
detecting a magnetic pole position of the electric motor based on an amount of change in the detected currents at the predetermined cycle.

* * * * *